United States Patent [19]
Put et al.

[11] Patent Number: 5,790,512
[45] Date of Patent: Aug. 4, 1998

[54] OPTICAL INFORMATION CARRIER

[75] Inventors: Paul L. M. Put; Albericus A. M. Hoevenaars, both of Eindhoven, Netherlands

[73] Assignee: U.S. Philips Corporation, New York, N.Y.

[21] Appl. No.: 755,614

[22] Filed: Nov. 25, 1996

Related U.S. Application Data

[62] Division of Ser. No. 362,622, Dec. 22, 1994, Pat. No. 5,605,782.

[30] Foreign Application Priority Data

Dec. 24, 1993 [BE] Belgium ............... 09301461
Aug. 5, 1994 [EP] European Pat. Off. ........... 94202262

[51] Int. Cl.$^6$ ................................................. G11B 7/24
[52] U.S. Cl. ........................... 369/275.4; 369/275.3; 369/116
[58] Field of Search ................. 369/275.4, 275.3, 369/275.2, 275.1, 116, 110, 44.32, 58, 112, 100, 109, 32, 54, 44.14, 44.41, 44.26, 283, 288; 428/641, 64.2, 64.4

[56] References Cited

U.S. PATENT DOCUMENTS

| | | | |
|---|---|---|---|
| 5,003,527 | 3/1991 | Matsumoto et al. | 369/100 |
| 5,040,165 | 8/1991 | Taii et al. | 369/275.4 |
| 5,442,615 | 8/1995 | Ohsato et al. | 369/100 |
| 5,492,744 | 2/1996 | Koike et al. | 428/641 |

*Primary Examiner*—Ali Neyzari
*Attorney, Agent, or Firm*—Edward W. Goodman

[57] ABSTRACT

A method for manufacturing optical information carriers, in which a photoresist layer (20) on a master disc (5) is exposed by a radiation beam (19). The intensity of the radiation beam is controlled by a modulator (14) and a control device (10) in such a manner that the exposure dose has a constant predetermined value over the length of a recorded area, which value is independent of the length of the area.

10 Claims, 11 Drawing Sheets

OPTICAL INFORMATION CARRIER

CROSS-REFERENCE TO RELATED APPLICATIONS

This is a division of U.S. patent application Ser. No. 08/362,622, filed Dec. 22, 1994, now U.S. Pat. No. 5,605,782.

BACKGROUND OF THE INVENTION

1. Field Of The Invention

The invention relates to a method of manufacturing an optical information carrier by recording information, comprising information units, in a master disc, in which a radiation beam scanning the master disc is modulated in power by the information and exposes a photoresist layer of the master disc to form a pattern of short and long exposed areas, and subsequently, the photoresist is developed to form a pattern of information areas, the beginning and duration of the exposure for each exposed area being determined by the associated information unit. The invention also relates to an arrangement for carrying out the method and to an optical information carrier obtained by carrying out the method.

An information unit is a portion of an information stream represented by a single feature on the master disc. For example, if a digital information signal alternately has a value zero and one and a signal portion having the value one results in an exposed area whose length is determined by the length of time for which the signal has the value one, this portion of the information signal is an information unit. An exposed area is called short if its length is smaller than twice the diameter of the radiation spot formed on the photoresist layer by the radiation beam, the diameter being the distance between two diametrically disposed points within the radiation spot where the local intensity is equal to half the maximum intensity in the radiation spot. For an Airy intensity profile formed by an objective lens, said diameter is equal to half the quotient of the wavelength of the radiation and the numerical aperture of the objective lens. An information area is an area on the master disc having properties which can be transferred to information carriers by a replication process, the corresponding areas on the information carriers being also referred to as information areas. Hereinafter, the term "area" without any further qualification refers to an exposed area in the photoresist, unless otherwise stated.

In the method of manufacturing an optical information carrier, the information is first inscribed in the master disc by exposure of the photoresist layer. The photoresist layer is subsequently developed, as a result of which information areas, for example, in the form of pits, are formed at the location of the exposed areas. Although hereinafter the information areas will often be referred to as pits, it will be obvious that these areas may also comprise hills. Subsequently, the master disc is provided with a metal layer. After the metal layer has been removed from the photoresist layer, it forms a die with a negative impression of the pattern of pits. The pattern of pits of the die is then transferred to a multitude of optical information carriers by a replication process such as, for example, a plastics molding process, which information carriers may subsequently be provided with one or more layers to make them reflecting and/or inscribable. In an information carrier which cannot be inscribed by the user, the pattern of pits represents the recorded user information. In an inscribable information carrier, the pattern of pits may represent not only user information but also tracking information by means of which a radiation beam, used for reading or writing information, can be guided over the information carrier.

The information density on the information carrier can be increased by arranging the pits closer to one another. However, more densely packed pits give rise to a deterioration of the quality of the signal generated when the information on the information carrier is read, as a result of which the reliability with which the information is read decreases. The deterioration of the quality inter alia manifests itself in increased jitter, i.e., an increase of irregular random variations of the signal. In order to enable an information signal to be derived from the information carrier with a sufficiently low jitter in the case of higher densities, the pits in the master disc should have a very accurately defined position and shape. One of the problems which limit an increase in information density is that with a constant power of the radiation beam during the recording of information in the master disc the short pits appear to become narrower than the long pits.

2. Description of the Related Art

U.S. Pat. No. 5,040,165 discloses a method of manufacturing an optical information carrier, which aims to solve the above problem. The power of the radiation beam exposing the photoresist layer is chosen to be 25% to 100% higher for recording short areas than for recording long areas. However, tests conducted on information carriers manufactured by means of this method reveal that the envisaged reduction of jitter is not achieved. Moreover, the ratio between the power for recording short areas and that for recording long areas appears to depend strongly on the type and condition of the photoresist used on the master disc, so that the quality of the information carriers obtained from different master discs is different.

SUMMARY OF THE INVENTION

It is an object of the invention to provide a method of the type defined in the opening paragraph which does not have the drawbacks of the known method.

To this end the method in accordance with the invention is characterized in that the exposure dose has substantially a constant predetermined value over the length of each recorded area, this value being independent of the length.

The invention is based on the recognition of the fact that the shape of the contrast curve of the photoresist layer is decisive for the ultimate shape of the pits in the information carrier. The contrast curve represents the development rate of the photoresist as a function of the exposure dose, which is the time-integrated amount of radiation per unit of area incident at a given location. The photoresists used for optical recording until now have a fairly linear contrast curve, i.e., an exposure dose which is twice as large yields a development rate which is twice as high. For optical recording with higher densities, it is now envisaged to use high-contrast photoresists in order to enable small well-defined pits to be formed. A first characteristic of a high-contrast photoresist is its threshold. An exposure dose below the threshold value provides a negligibly low development rate. A second characteristic of a high-contrast photoresist is that above the threshold value, the development rate increases very rapidly as a function of the exposure dose. The known method uses two different intensities for writing short areas and long areas, which generally results in two different exposure doses. This leads to different development rates for the short and the long areas, the difference in development rate increases as the contrast increases. The shape, i.e., the length, width and/or depth, of the short and the long pits formed after development of the photoresist, therefore depends critically on the differences in radiation power used during exposure.

A second drawback of the known method is its sensitivity to changes in the shape of the contrast curve, which can be understood as follows. The amount of photoresist material which is transformed by a given exposure dose is comparatively insensitive to the temperature. Conversely, the development rate, i.e., the rate at which the transformed material is dissolved in a developer, depends strongly on both the temperature and the characteristics of the photoresist and on the concentration of the developer. The shape of the contrast curve is determined by the characteristics of the photoresist and the developer, and therefore, turns out to be strongly dependent on the temperature, composition and age of the photoresist. Since the contrast curve gives the relationship between the exposure dose and the development rate, a change of the contrast curve will result in a change of the development rate. As the contrast curve for high-contrast photoresists is very steep, the variations of the development rate for these photoresists are substantial and depend strongly on the exact exposure dose. For this reason, the shape of the pits cannot be controlled satisfactorily in the known method.

The method according to the invention, however, is highly insensitive to the exact shape of the contrast curve as a result of the method of exposure of the photoresist layer. For this purpose, the power of the radiation beam is controlled in such a manner that the exposure dose has substantially a constant value over the length of an exposed area, the value being equal for areas of different lengths. Substantially equal means equal within about ±/3%. For this, the leading and trailing portions of each area have been ignored and the exposure is measured along the centerline of the exposed areas. As a result of the equal exposure doses, the development rate for each area is also equal regardless of the shape of the contrast curve. If the shape of the contrast curve deviates from the presumed shape, the development rate of both short and long areas will change similarly. The change in development rate can be corrected simply by appropriately reducing or extending the development time for the photoresist layer. Thus, the short and long pits will be given the desired shape independently of the exact shape of the contrast curve. As a result, jitter is reduced, and, consequently, the length of the pits and the distances between the pits can be reduced in order to increase the information density on the information carrier.

The radiation beam forms a radiation spot with a certain intensity profile on the photoresist layer. During writing, the radiation spot is moved over the photoresist layer. The exposure dose at an arbitrary location of the photoresist layer is therefore determined by the convolution of the profile and its displacement. When a small area is exposed, the displacement of the radiation spot is small relative to the size of the radiation spot, in contrast with a long area, where the displacement is larger than the size of the radiation spot. As a result of the convolution effect, the exposure dose in a small area is consequently lower than the exposure dose in a long area. A special embodiment of the method in accordance with the invention is therefore characterized in that the power of the radiation beam during exposure of short areas is made higher than the power of the radiation beam during exposure of long areas, so that the exposure dose in short and long areas is substantially equal. The value of the power as a function of the length of an area to be exposed follows from the requirement that the local exposure dose should have substantially the same constant predetermined value for all the areas.

In certain situations, the last-mentioned embodiment of the method leads to comparatively short exposed areas in the photoresist layer when long information units are written, and thus to comparatively short pits. This could be corrected by a slightly longer development of the photoresist layer. However, the short areas are then also developed longer, as a result of which the short pits would become too long. An embodiment of the method in accordance with the invention is therefore characterized in that the duration of the exposure of a long area is selected to be longer than the duration of the associated information unit. The magnitude of the extension is independent of the slope of the contrast curve and is between a few percent and about 20 percent for long areas and zero for short areas.

A special embodiment of the method, according to the invention, is characterized in that the exposure of a long area is started before the beginning of the associated information unit. Since recording in a photoresist is a symmetrical process, the extension of the exposure time should be symmetrical relative to the nominal location of the area, i.e., exposure should begin sooner and stop later than prescribed by an information unit.

The intensity profile of the radiation spot generally has a central lobe of high intensity surrounded by, generally ring-shaped, side lobes of lower intensity. During writing, the radiation spot moves over the photoresist layer, as a result of which some locations on the photoresist layer are irradiated successively by both the central lobe and one or more side lobes. By now reducing the power of the radiation beam at such locations, according to a special embodiment of the method of the invention, it is yet possible to obtain a constant exposure dose over the length of an exposed area.

When the information density of the information carrier is to be increased, the areas on the master disc have to be recorded closer to one another. When a first area is exposed, both an adjacent second area and the part of the photoresist layer disposed between these areas will be exposed to a low dose owing to the size of the radiation spot. In this intermediate area, the exposure dose will remain below the threshold of the contrast curve and will not lead to the formation of information areas. In the second area, the low dose is added to the exposure dose already administered or to be administered to form this second information area. The addition leads to a slightly higher exposure dose for the second area than in the case that the two areas would be remote from one another. Owing to the steepness of the contrast curve, this slight increase of the exposure dose of the second area results in a noticeable increase in development rate. As a consequence, information areas which are situated closer to one another become larger than information areas which are situated farther apart. This distortion gives rise to increased jitter. The method can be modified in two different manners in order to correct for the effect described above.

In a first modification, the method, according to the invention, is characterized in that during the recording of two adjacent areas, the part of each area situated nearest the other area is recorded with a power of the radiation beam which is a monotonically non-decreasing function of the distance between the two areas. During writing, the power in the radiation beam is controlled in such a manner in dependence upon the distances from the adjacent areas that the exposure dose in the area has the required constant value, so that no distortion dependent on the distance between the areas occurs.

In a second modification the method, according to the invention, is characterized in that during passage between two areas, the radiation beam has a power lower than the power for recording these areas and the power has a monotonic non-decreasing relationship with the distance between the two areas. In this way, it is achieved that an adjacent area is given a fixed additional exposure independently of the distance from other areas. Jitter is now reduced because all the areas have the same distortion. The additional exposure dose should be smaller than about three percent of the constant, predetermined value of the exposure dose.

According to the invention, an arrangement for carrying out the method is provided, this arrangement comprising an apparatus for recording information in a master disc by exposure with a radiation beam according to a pattern of short and long exposed areas, this apparatus comprising a radiation source for producing a radiation beam, an intensity modulator, and a control device associated with said modulator, an optical system for forming a radiation spot on the master disc by means of the radiation beam, and means for moving the master disc and the radiation spot relative to one another. The arrangement is characterized in that the control device is adapted to control the modulator in such a manner that the exposure dose has substantially a constant predetermined value over the length of an exposed area, which value is independent of said length. Such an apparatus is also called a master recorder.

A special embodiment of the arrangement, according to the invention, is characterized in that the control device comprises a memory for storing the relationship between, on the one hand, the duration of the information units and, on the other hand, at least one of the parameters the beginning, the duration, and the power of the exposure.

In a preferred embodiment, the control device comprises a coding circuit for assigning a code to an information unit in the information to be recorded, this code representing the length of the information unit and is associated with an address of the memory. Whereas, the information is, in general, presented as a serial data stream, the code may be a presented as a parallel data stream. The code can thus be processed in parallel at a lower clock frequency than the information. As a consequence, components of the control device need not be designed for very high clock frequencies and may be standard components.

For recording information with a high density, the arrangement is preferably characterized in that the optical system includes a filter. A filter enables the amplitude or the phase of the radiation to be influenced in such a manner that the size of the central lobe of the radiation spot is reduced, as a result of which the exposed areas can also become smaller.

A special embodiment of the arrangement, according to the invention, is characterized in that the filter comprises an elliptical phase plate. The elliptical shape enables the power of the side lobes of the intensity profile in the writing direction to be reduced in comparison with a circular phase plate, as a result of which the write strategies in accordance with the invention yield a better result.

It is to be noted that European Patent Application 0,411, 525 discloses a rectangular phase plate having a length equal to the diameter of the pupil of the optical system. However, by means of such a phase plate, it is not possible to form a radiation spot suitable for a master recorder, which spot should have small dimensions in two directions.

An optical information carrier manufactured by means of the method, according to the invention, is characterized in that the lengths of the information areas deviate less than 10% from the lengths of the associated information units. This deviation is smaller than that of information carriers not manufactured by means of the method in accordance with the invention. The smaller deviation leads to a reduction of jitter in the read signal obtained from the information carrier.

The optical information carrier is further characterized in that the distances between adjacent information areas deviate less than 50 nm from the distances between the associated information units. A more accurate definition of the distances between adjacent information areas, like the more accurate definition of the lengths of the information areas, also leads to a reduced jitter.

The optical information carrier is further characterized in that the spread in width of the information areas is smaller than 30 nm. A well-defined width of the information areas yields a well-defined magnitude of the read signal. This also results in a reduction of jitter.

BRIEF DESCRIPTION OF THE DRAWINGS

Some embodiments of the invention will now be described in more detail, by way of example, with reference to the drawings. In the drawings.

DESCRIPTION OF THE PREFERRED EMBODIMENTS

Figure 1:
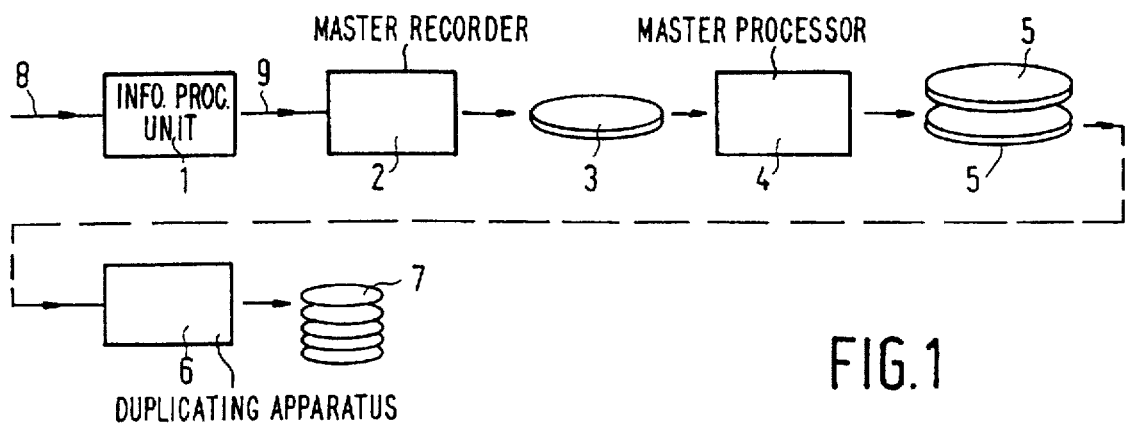
FIG. 1 shows an arrangement for manufacturing information carriers.

FIG. 1 shows an arrangement for manufacturing an optical information carrier. Such an arrangement generally comprises an information processing unit 1, an apparatus for recording information in a master disc 3, or master recorder 2, an apparatus 4 for processing the master disc 3 and making dies 5 by means of the master disc 3, and a duplicating apparatus 6 for making impressions of the dies in information carriers 7. Information 8 to be recorded on the information carriers is applied to an input of information processing unit 1. The information includes tracking information to be recorded in a geometry of, for example, tracking grooves or tracking pits, address information to enable given locations on the information carrier to be identified, information to enable a subsequent correction of read errors and, if required, data which can be read by the user of the information carrier. The information processing unit 1 derives signals 9 for controlling master recorder 2 from the input information 8. With the aid of the control signals, the master recorder records the information in master disc 3 as a pattern of exposed areas in a photoresist layer. In an exposed area, the radiation of the beam is absorbed so that locally, the material in the photoresist is transformed and the solubility of the photoresist layer changes. The solubility, and hence the rate of development of the photoresist layer, increases as the exposure dose increases. The master recorder is an essential part of the arrangement and will be discussed in more detail hereinafter. The photoresist layer of master disc 3 is developed in apparatus 4, thereby converting the exposure pattern into a pattern of information areas in the form of pits and/or grooves in the photoresist layer. Subsequently, a metal layer is deposited onto the photoresist layer. After removal from the photoresist layer, the metal layer forms a die 5 with an impression of the pattern of pits. By means of such a die, duplicating apparatus 6 makes impressions of the pattern of pits in information carriers by means of, for example, a plastics molding process or a replication process based on photopolymerization, a so-called 2P process. From a single master disc 3, a plurality of dies 5 can be made, and with each die, hundreds to a few thousands of information carriers 7 can be made, so that thousands to millions of identical information carriers can be manufactured by means of a single master disc. The method may comprise a plurality of duplication steps, in which a plurality of dies are made from a single die.

Figure 2:
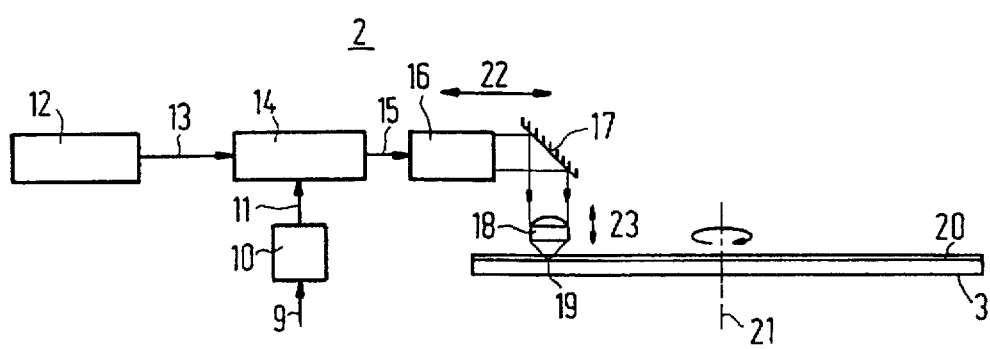
FIG. 2 shows an apparatus for recording information in a master disc.

FIG. 2 shows an embodiment of master recorder 2 for inscribing the round master disc 3. It will be evident that with a slight modification, such a recorder can also be adapted to inscribe masters of other form, for example, rectangular masters for making rectangular optical information cards or elongated masters for making optical tape. Master recorder 2 comprises a radiation source 12, for example, an argon-ion laser, which produces a radiation beam 13. The power of the radiation beam is pulse-modulated by an electro-optical or acousto-optical modulator 14 in dependence upon an output signal 11 of a control device 10, which has an input for receiving signals 9 from information processing unit 1. The control device converts signals 9 into signals suitable for controlling modulator 14. When a radiation source which can be modulated rapidly, such as, for example, a semiconductor laser, is used, the laser can be controlled directly by control device 10, and the radiation source 12 and modulator 14 will form a single device. An intensity-modulated radiation beam 15 from the modulator 14 is focused to form a radiation spot 19 on the photoresist layer 20 of the master disc 3, for example, by a beam widener 16, a mirror 17 and an objective lens 18. By rotating the master disc about an axis of rotation 21 and, at the same time, moving optical elements 17 and 18 in a radial direction 22, it is possible to write concentric or spiral tracks in the photoresist layer. As a result of the movement of the radiation spot and the photoresist layer relative to one another, the length of time of an information unit and the associated exposure time can be converted to a length of the information unit and of the exposure. During recording, the radiation beam is kept in focus on the photoresist layer in that objective lens 18 is made to follow a vertical movement 23 of the master disc via feedback. If the master disc rotates with a constant angular velocity, the power in the radiation beam should increase as a linear function of the radius of the track to be written in order to maintain a constant exposure dose. This slow variation of the power can be effected by modulator 14.

Figure 3:
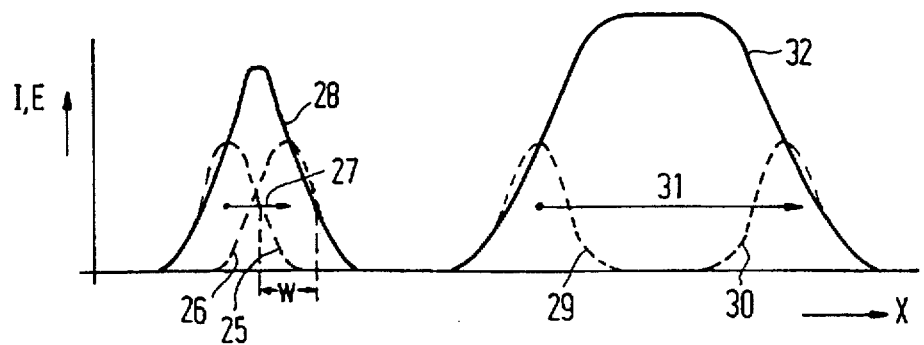
FIG. 3 gives the intensity and exposure dose as a function of the location on the master disc.

The effect of the mutual displacement of radiation spot 19 and master disc 3 during the recording of an area in the photoresist layer will be illustrated with reference to FIG. 3. When an area is recorded in the photoresist layer, the photoresist layer is irradiated by radiation spot 19. A dashed curve 25 in FIG. 3 represents the intensity profile of the radiation spot as a function of the location. The location x on the photoresist layer in the direction of movement of the radiation spot is plotted along the horizontal axis, the intensity I being plotted along the vertical axis. For the sake of simplicity, the intensity is represented as a bell-shaped curve, although the curve will generally have a so-called Airy profile, which is characteristic of a diffraction-limited radiation spot formed by a lens having a circular aperture. Curve 25 shows the profile at the instant at which the radiation beam is turned on to expose an area, and a curve 26 shows the profile at the end of the exposure after a displacement represented by an arrow 27. The exposure dose of the photoresist layer in the exposed area is the convolution of the intensity profile and the displacement thereof. The dose profile, which is the exposure dose as a function of the location, is represented by a solid curve 28 in the Figure, for which the exposure dose E is plotted along the vertical axis. The length of the exposed area in the situation shown is short in comparison with the diameter of the intensity profile of the radiation spot, which is referenced w in the Figure.

FIG. 3 also shows the situation for exposure of a comparatively long area. When exposure begins, the intensity profile is given by a dashed curve 29, which has the same shape as intensity profile 25; at the end, it is given by a curve 30, after the center of the profile has performed a travel represented by an arrow 31, whose length is greater than twice the diameter of intensity profile 29. The associated dose profile, represented by a curve 32, has a flat maximum which is slightly higher than the maximum of curve 28. The maximum exposure dose of curve 32 is reached only in areas where the intensity profile has moved over a distance greater than approximately twice the diameter of the profile.

Figure 4A:
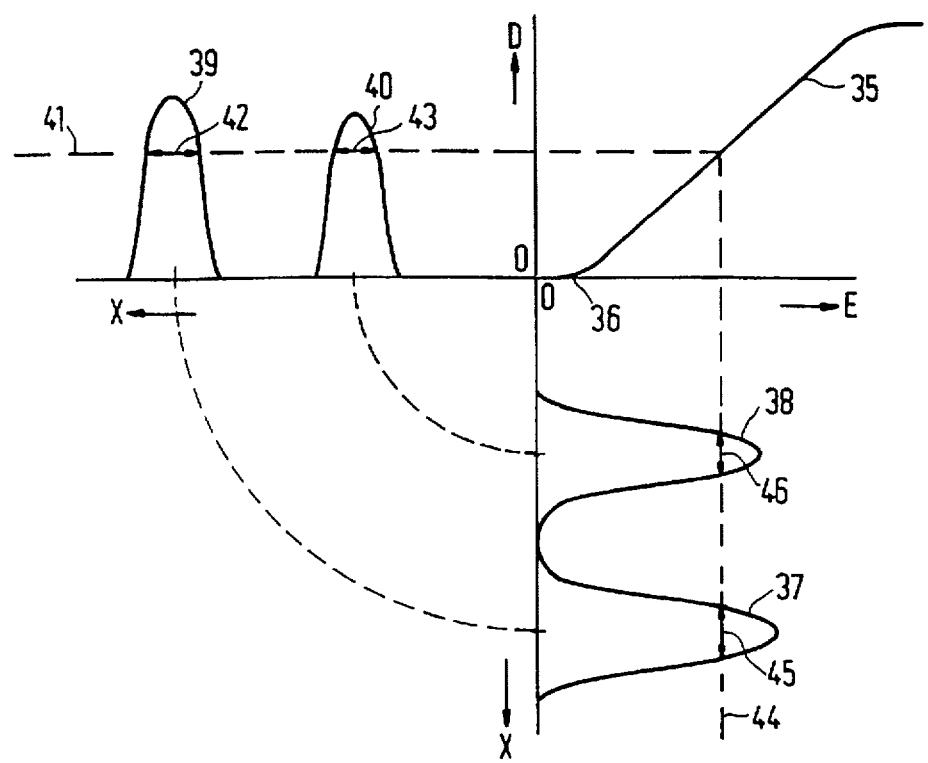
FIG. 4a shows the relationship between exposure dose and development rate for a low-contrast photoresist.

During the developing process, the exposed areas of the photoresist layer are dissolved in a developer liquid. The contrast curve of the photoresist dictates the relationship between the dissolution rate, also called development rate, and the exposure dose, as is shown in FIG. 4a. The top-right quadrant of the Figure shows a typical contrast curve 35 for a photoresist having a comparatively low contrast, the exposure dose E being plotted along the horizontal axis and the development rate D along the vertical axis. A threshold value 36 represents the exposure dose below which an exposure gives a negligibly small development rate. The bottom-right quadrant shows the dose profile of two areas, i.e., the exposure dose as a function of the location x on the photoresist layer. The maximum of dose profile 37 of the first area is slightly higher than the maximum of dose profile 38 of the second area, which difference may have been caused as explained with reference to FIG. 3. By means of the contrast curve shown in the top-right quadrant, the exposure doses in the bottom-right quadrant can now be translated into development rates shown in the top-left quadrant, which rates are again represented as a function of the location x on the photoresist layer. Thus, dose profiles 37 and 38 yield development profiles 39 and 40, respectively. During development, the photoresist layer dissolves at a rate proportional to the development profile. At the location of development profiles 39 and 40, this results in information areas in the form of pits in the photoresist layer, whose depth, length and width depend on the shape of the contrast curve and the development time. The exact shape of the pit is not determined entirely by the shape of the development profile but also depends on other factors in the development process. One of these factors is that the direction of the development rate is always perpendicular to a surface to be developed, so that at the beginning of the development process, the rate is perpendicular to the photoresist layer but is perpendicular to the inclined walls of a pit already formed. Since the thickness of the photoresist layer is generally equal to the desired depth of an information area or pit, which depth is comparatively small, a short development time already results in a pit of a depth equal to the thickness of the photoresist layer. Consequently, prolonged exposure will not cause the depth to change and only the length and width of the pit will increase proportionally to the development rate at a given location on the photoresist layer.

The length of a pit may be defined in various ways, for example, as the length of that part of a pit which has a depth equal to the thickness of the photoresist layer, or of that part of the pit situated between the positions at the leading and trailing edge where the depth is equal to half the thickness of the photoresist layer. For a given development process, this depth d, whose value depends on the adopted definition, is reached in a time t, which complies with $t=d/D$, where D is the development rate. The points of development profiles 39 and 40 which have been developed to a depth d in the time t are situated on a so-called development line, represented by a line 41 in FIG. 4a. After termination of the process, the developed pits have lengths represented by arrows 42 and 43. In the case of a longer development time, line 41 is situated at a lower development rate D because the product of t and D is constant for the development line, as this development line is associated with a particular, constant value of the depth d. As a result, the lengths of the resulting pits increase. The slope of the walls of the pits is determined by the slope of profiles 39 and 40, where these profiles intersect line 41. Owing to the comparatively low threshold 36 in contrast curve 35, side lobes or minor lobes of the two profiles 37 and 38 may give rise to elongation of the pits. The slightly different exposure doses of profiles 37 and 38 in FIG. 4a result in two pits of different lengths, represented by arrows 42 and 43. Contrast curve 35 relates the development line to an exposure dose line 44 in the bottom-right quadrant of the Figure. Intersections 45 and 46 with dose profiles 37 and 38 represent the lengths of the ultimately formed pits. The lengths of arrows 45 and 46 are equal to those of arrows 42 and 43, respectively.

Figure 4B:
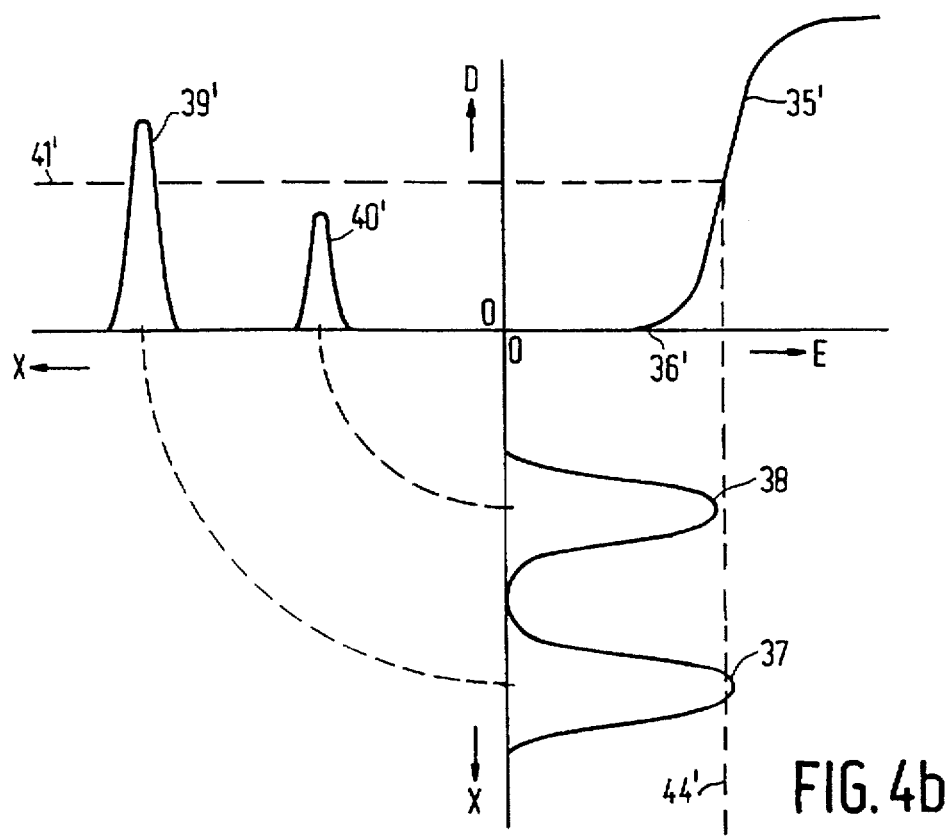
FIG. 4b shows the relationship between exposure dose and development rate for a high-contrast photoresist.

Similarly to FIG. 4a, FIG. 4b shows a relationship between exposure dose and development rate but now for a photoresist of high instead of low contrast. The high contrast manifests itself in the slope of contrast curve 35' and the high threshold 36'. Dose profiles 37 and 38 in FIG. 4b are equal to the dose profiles in FIG. 4a. However, the resulting development profiles 39' and 40', respectively, deviate considerably from profiles 39 and 40. In the first place, the steeper contrast curve results in steeper walls of the pits and hence in narrower pits. Moreover, owing to the high threshold 36', the side lobes of the two profiles 37 and 38 do not give rise to elongation of the pits. As a result, the pits thus formed can be smaller and can be packed more densely, so that the information density of the information carrier increases. Secondly, there is a substantial difference between the maximum development rates of the two profiles 39' and 40' in spite of the comparatively small difference between the maximum exposure doses of profiles 37 and 38. The fact that the small differences give rise to such a strong effect is due to the steepness of the contrast curve 35' and an exposure dose line 44' lying close to the maximum of the profiles 37 and 38. When a high-contrast photoresist is used, the length and width of the resulting pits will therefore depend strongly on the exact value of the exposure dose in the exposed areas. The pit formed by development profile 39' will be longer and wider than the pit formed by profile 40'. The differences between the shapes of the two pits depends, moreover, on the exact conditions of the development process. This is clarified by means of the extreme case shown in FIG. 4b, where, for a particular development process, development line 41' intersects development profile 39' and is situated above profile 40'. Profile 39' results in a pit developed to the required depth, whereas profile 40' yields a pit not having the required depth. The resulting variation in depth, width and length of the pits in the master disc is transferred to the information carriers by the replication process, and leads to an increased jitter during reading of the information carriers. Differences in exposure doses cannot be corrected by a change in development time during the development process.

The shape of the pits is influenced not only by the exposure dose, but also by the parameters of the development process. Aging of the photoresist used for the photoresist layer, a variation of the concentration of ingredients of the photoresist and a variation of the developer concentration all lead to a variation of the slope and threshold value of contrast curves 35 and 35'. This results in a change of development profiles 39, 40 and 39', 40', respectively. These changes can be corrected only partly by means of a longer or shorter development time.

In general, the information units to be recorded on the master disc have different durations, resulting in exposed areas of different lengths. The exposure dose for any arbitrary length of the exposed areas can be determined from a convolution of the intensity profile of the radiation spot and the displacement of the radiation spot in the manner as described with reference to FIG. 3. After that, the development rate for the various areas can be determined via contrast curves 35 and 35' in FIGS. 4a and 4b, respectively. The desired length of the exposed areas in the photoresist layer is dictated by the desired information density and the information coding method. In order to obtain a high density, the length of the shortest area is minimized. In some situations, it is desirable to record areas of a length shorter than twice the diameter of the radiation spot, i.e., shorter than the quotient of the radiation wavelength and the numerical aperture of the objective lens 18 in the case of an Airy intensity profile. A customary method of coding digital signals is the so-called eight-to-fourteen modulation (EFM). Hereinafter, the EFM coding has been used by way of example, but the invention is not limited to this coding. In the case of EFM coding, the length of time of the information units in the digital information signal is an integral multiple of a fixed basic time, which multiple lies between 3 and 11. A part of the information signal with a duration of a basic time is called a bit cell. The basic time can be translated into a basic length via the speed of movement of the radiation spot over the photoresist layer. The information units and the associated information areas are therefore designated I3 to I11, depending on their lengths. The information stored in the so-called Compact Disc is EFM coded.

Figure 5:
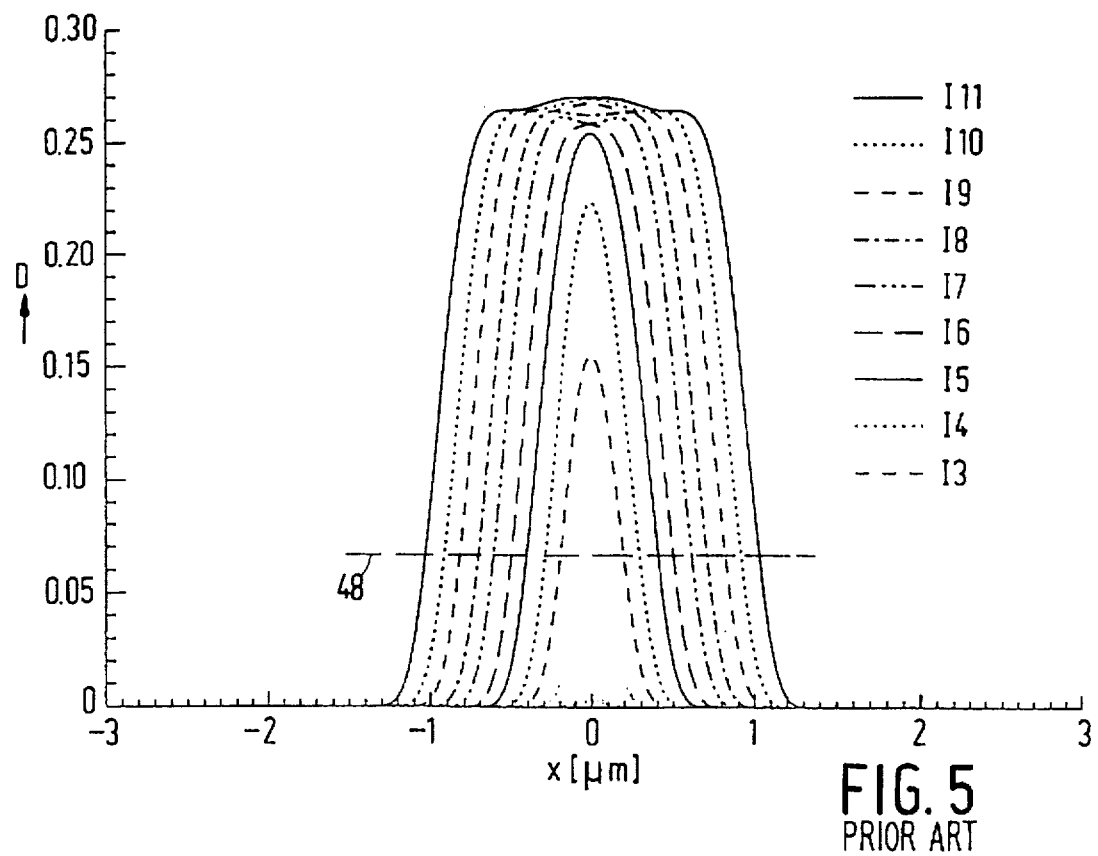
FIG. 5 shows development profiles for EFM information units recorded without a write strategy.

FIG. 5 shows development profiles for EFM areas I3 to I11 having a basic length of 208 nm, for which a pulsed radiation spot with an Airy intensity profile and a constant power during the pulse, independent of the length of the areas to be recorded, and a high-contrast photoresist have been used. The profiles have been obtained during recording on a master disc with a high information density by means of a radiation beam whose wavelength is 458 nm and an objective lens 18 with a numerical aperture of 0.45. The profiles shown apply to the axis of a track written by the radiation spot, x being the distance along this axis. The Figure shows that the short areas I3, I4 and I5 in the center, i.e., for x=0, have a comparatively low development rate as compared with the longer areas. This is caused by the fact that the short areas have received a lower maximum exposure dose than the I6 and longer areas, where the maximum exposure dose as shown by curve 32 in FIG. 3 is reached. As a result of the convolution effect, as explained hereinbefore with reference to FIG. 3, the development rate for the short areas is substantially lower than for the long areas. If a development line 48 is situated at the level shown in FIG. 5 the lengths of the pits formed for I3, I4 and I5 areas appear to be substantially shorter than the lengths of the associated information units, i.e., 3, 4 and 5 times the basic length of the EFM coding, whereas the lengths of longer pits are slightly too short. The discrepancy between the deviations from the length of short pits and that of long pits renders the read signal generated by these pits highly unreliable. U.S. Pat. No. 5,040,165 discloses a method which improves the length of the short pits by making the power in the radiation beam higher during the recording of such short areas than during the recording of long areas. This results in a higher maximum exposure dose and a higher maximum development rate for the short areas. Although this known method yields an improvement of the length of the pits, the problem of a strong dependence of the pit shape on the exact exposure dose and on the value of the parameters of the development process, as described in the previous paragraph, persists.

According to the invention, the deviations from the desired length and width of the pits or information areas are reduced considerably by giving the dose profiles of all areas, both the short and the long ones, substantially the same maximum exposure dose. As a result of this, the maximum development rate of all the development profiles becomes the same so that no undesirable variations in pit length and width depending on the development process arise. "Substantially the same" means the same within about 3 percent. Should an exposure dose have become too high or too low for all the areas, correction is possible, if the dose is above the threshold, by slightly reducing or increasing the development time so as to obtain the desired shape of the resulting pits. The exposure method in accordance with the invention also reduces the dependence of the pit shape on development process parameters. The exposure method ensures that all development profiles 37, 38 have the same slope at the location of intersection with exposure dose line 44. If all development profiles become less high as a result of a change of the contrast curve, the pits become narrower and shorter to the same extent when the development conditions remain the same. During the development, the length of each pit can subsequently be increased by the same amount so as to obtain the desired length by slightly increasing the development time relative to the nominal development time.

Figure 6:
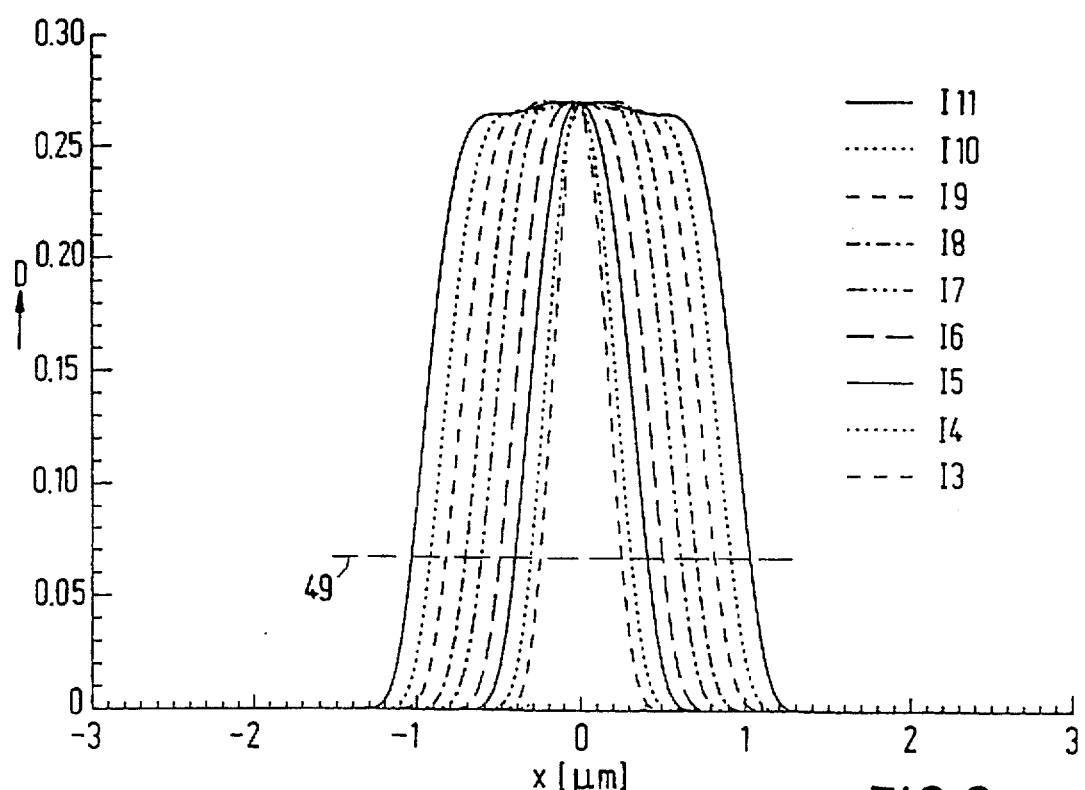
FIG. 6 shows development profiles for EFM information units recorded with the first write strategy.
Figure 7:
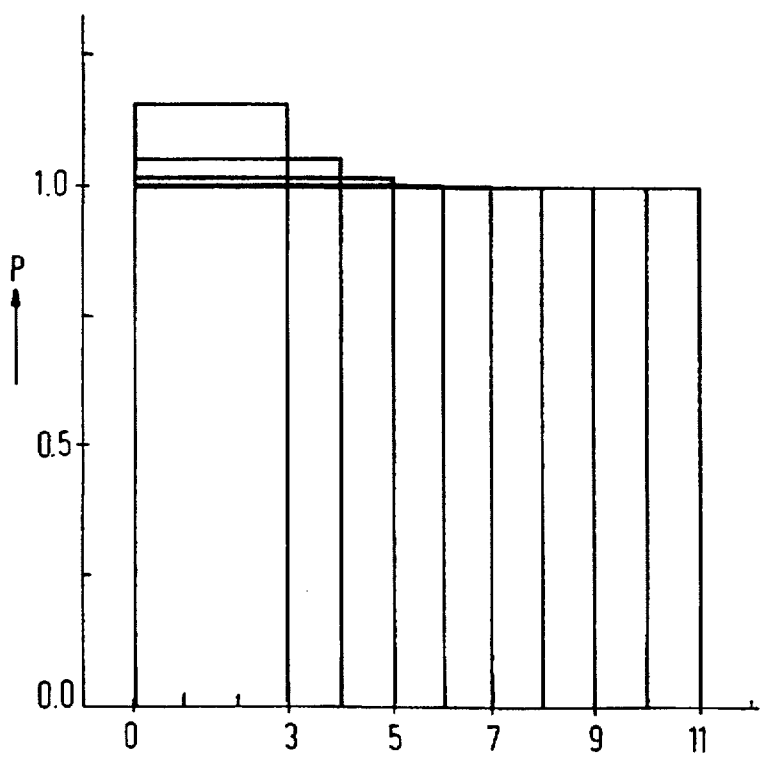
FIG. 7 gives the power of the radiation beam in accordance with the first write strategy as function of the length of the area to be written.

FIG. 6 shows, for EFM coded signals I3 to I11, the development profiles as obtained by using the first write strategy in accordance with the invention, for which the maximum exposure doses in the exposed areas have been equalized. The power in the radiation beam depends on the length of the information unit in a manner as shown in FIG. 7, in which the number of basic lengths of the information unit has been plotted along the horizontal axis, and the normalized power P of the radiation beam along the vertical axis. The power for areas shorter than I6 increases as the length of the areas decreases. The decrease can be approximated mathematically by an exponential function. In the Figure, the power for I3 is 15% higher than for I11. The magnitude of the power for equal exposure doses can be calculated from the convolution of the intensity profile of the radiation spot and its displacement. The power in the laser beam in the example shown in FIG. 7 is modulated by changing the transmission of the modulator 14 in the laser beam. It is also possible to change the power of the laser beam by changing the repetition frequency of short pulses of laser radiation. The repetition frequency is so high that a series of such short pulses causes substantially the same irradiation pattern on the master disc as a single long pulse. A short information unit, such as an I3, is recorded with a higher repetition frequency of the short pulses than a long information unit, such as an I11. The higher repetition frequency increases the average power of the radiation beam, which is required for recording short information units.

A further advantage of the first strategy, apart from the insensitivity to variations in the development process parameters, is that the width of the pits is independent of the length of the pits, in contradistinction to the teaching of U.S. Pat. No. 5,040,165. If short pits are narrower than long pits, as in the case of recording without any write strategy, the read signal produced by the short pits will be comparatively small. If short pits are wider than long pits, as resulting from the write strategy known from said United States patent, the amplitude of the read signal originating from the short pits will be larger, but the jitter of the read signal will also be comparatively high. Moreover, as a result of this larger width, the tracks of the information carrier cannot be arranged sufficiently close to one another, which limits the increase in information density. It appears that the read signal jitter is minimal in the case of an equal width for short and long pits, which is the case when the first write strategy in accordance with the invention is used.

Figure 8:
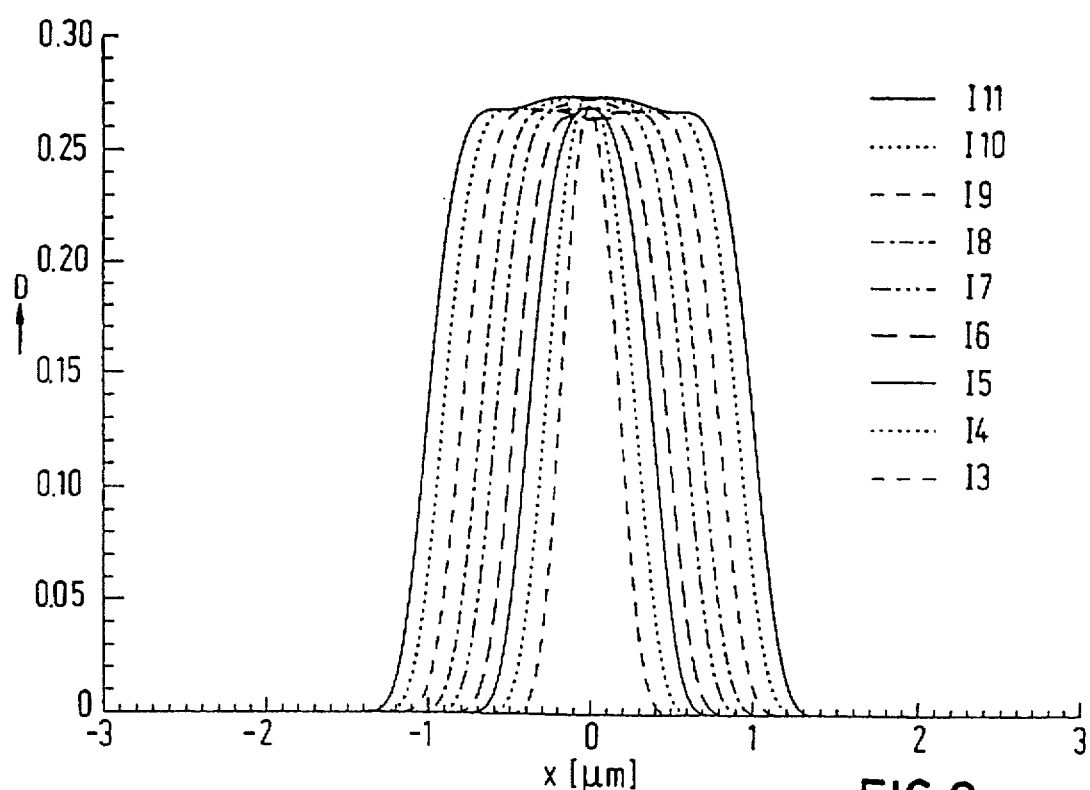
FIG. 8 shows development profiles for EFM information units recorded with the second write strategy.
Figure 9:
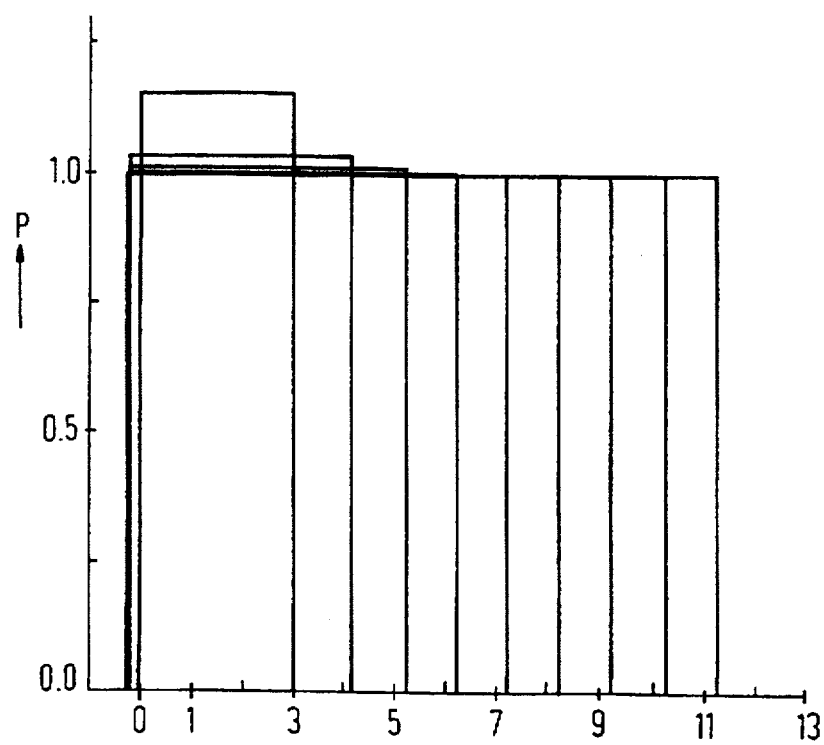
FIG. 9 gives the power of the radiation beam in accordance with the second write strategy as function of the length of the area to be written.

Under certain circumstances, it may occur, depending on the basic length of the information areas, the numerical aperture of the optical system and the wavelength of the radiation beam, that, in the case of the first write strategy, the lengths of the resulting short pits are too great or the lengths of the short pits are too small. In order to solve this problem, the invention provides a second write strategy. In accordance with this strategy, the exposure time for the long areas is first of all slightly increased. Secondly, in order to maintain the nominal location of the information area, exposure is extended symmetrically both at the leading and the trailing end of each long information unit. In the third place, the development time is increased or reduced, if necessary, to such an extent that the shortest information area has the desired length of the information unit. Such a reduction or increase of the development time, respectively, corresponds to an upward or downward shift of development line 49 in FIG. 6. This results in all the information areas being shortened or extended. FIG. 8 shows the development profiles for the areas I3 to I11 obtained with the second write strategy. FIG. 9 shows the corresponding power of the radiation beam as a function of the length of the information units. As compared with FIG. 7, where the second write strategy has not been used, it is clearly visible that with the second write strategy, the actual exposure for the area I4 and the longer areas begins before the beginning of the information unit, i.e., before the length 0 on the horizontal axis of the Figure. When the radiation power is delivered by a beam of short pulses, the average power can be adjusted by varying the repetition frequency of the pulses. The advancement of the exposure for the longer information units can be achieved by a change in the phase of the short pulses.

Figure 10:
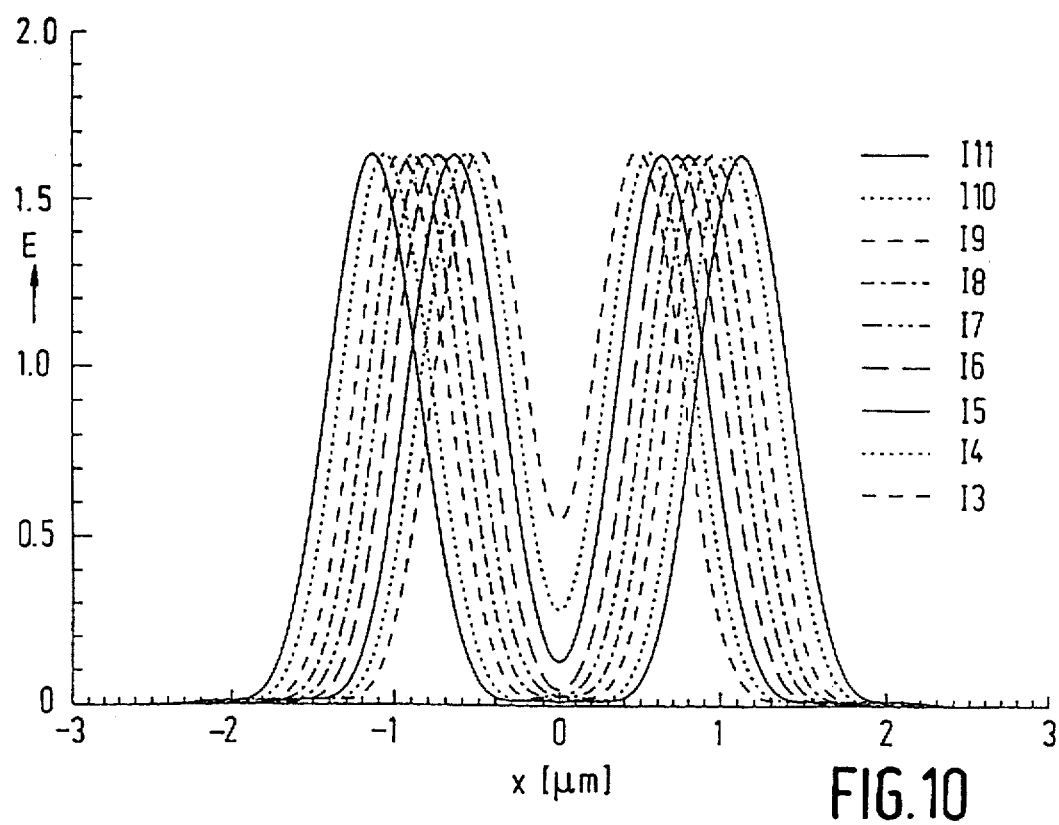
FIG. 10 gives exposure doses for a series of two short areas at different distances.
Figure 11:
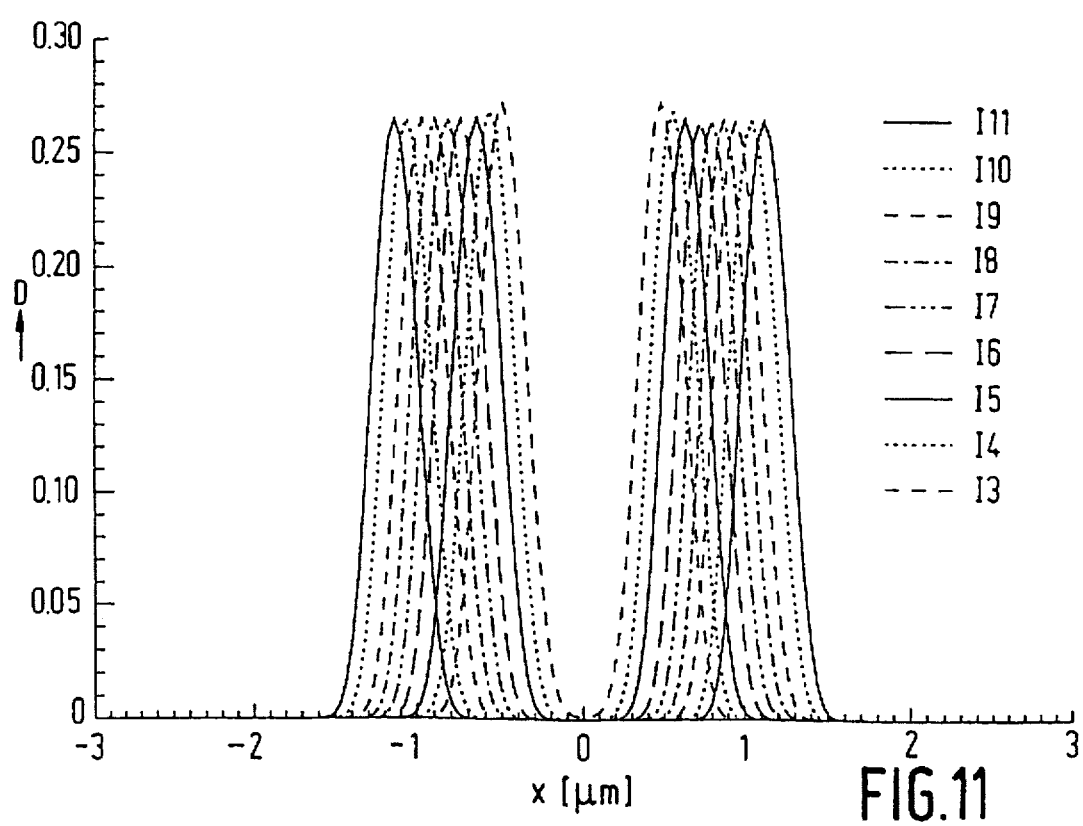
FIG. 11 shows the development profiles associated with the dose profiles in FIG. 10.

So far, only the effects which occur when isolated areas are exposed have been considered. If the information density is increased, problems will arise because not only the areas themselves, but also, the distances between the areas become smaller. The dose profiles of adjacent areas will then overlap and the shape of the resulting information areas will become dependent on the distance between adjacent areas. FIG. 10 illustrates this effect for a series of pairs of adjacent I3 dose profiles, an intermediate area being situated between the two profiles of each pair, which intermediate area has a length which is a multiple of the basic length, as indicated in the Figure. The profiles correspond to an NA of 0.45 and a λ of 458 nm, as for the master recorder described above, and a basic length of 162 nm of the information units. The most prominent effect is the comparatively high exposure dose in the intermediate area. Moreover, there is a slight increase of the maximum dose in the exposed areas themselves as the distance between the areas decreases. FIG. 11 shows the development profiles associated with the dose profiles of FIG. 10 for a high-contrast photoresist. As a result of the threshold of the contrast curve, the comparatively high exposure dose in the intermediate area does not lead to an increased development rate. Conversely, the slightly higher maximum exposure dose of the areas which are closest to one another leads to a significant increase of the maximum development rate owing to the slope of the contrast curve. As a result, pits which are situated close to one another become too large.

Figure 12:
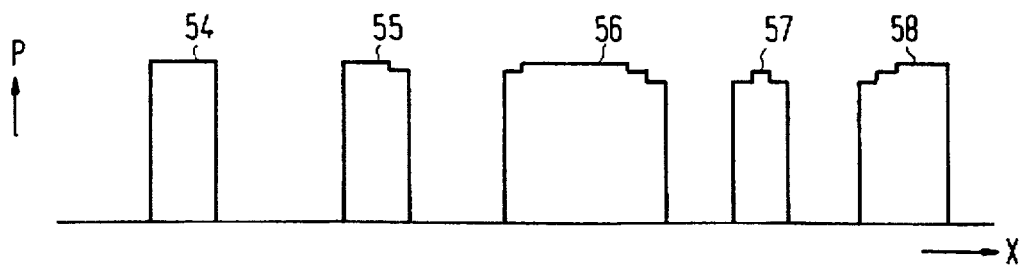
FIG. 12 gives the power of the radiation beam in accordance with the third write strategy for a series of areas to be written.

This problem is solved by the use of a third write strategy, in accordance with the invention, according to which the power in the radiation beam for recording an area is adapted to the distance from the previously written area and the area to be written subsequently, in such a manner that the desired constant exposure dose is obtained over the length of the area. For each combination of the lengths of three consecutive exposed areas and the two intermediate areas, it is, therefore, required to calculate the power needed for writing the central exposed area. Apart from the lengths of the intermediate areas, allowance is to be made for the lengths of the exposed areas themselves because the power of the radiation beam, and hence, the effect of the overlap, in accordance with the first write strategy depends on the length of the areas. FIG. 12 shows, diagrammatically, the power P of the radiation beam for recording a series of areas in accordance with the third write strategy, where, for the sake of clarity, the nominal power in a pulse is assumed to be independent of the length of the pulse. Pulse 54 has the nominal power because it is spaced so far from the adjacent pulses that the dose profiles do not overlap. Pulse 55 has the nominal power at its left side because of the large distance from pulse 54. At the right-hand side, the power should be reduced slightly because of the overlap of the associated dose profile with that of the next pulse 56. Likewise, the power at the left-hand side of pulse 56 must be reduced. The magnitude of the power reduction can be determined from the shape of the intensity profile of the radiation spot and the distances between the pulses. Owing to the comparatively short distance between pulse 56 and the following pulse 57, both pulses should exhibit a comparatively large power reduction over a larger distance, as is shown in the Figure. The maximum power of pulse 57 does not reach the nominal value because the pulse is comparatively short and the adjacent pulses at both sides are situated at short distances. It is not necessary to reduce the power of the pulses stepwise as shown in the Figure. Reduction is also possible in accordance with, for example, a straight line or a smooth curve. In order to simplify implementation of the third write strategy the power reduction may be applied only to those pulse pairs which have the shortest spacing, for which pulses, the overlap effect is strongest.

A fourth strategy provides an alternative solution for the effect of too large information areas owing to a short distance between them. In this strategy, the intermediate areas are deliberately irradiated. The magnitude of the exposure dose applied between the areas to be written increases with the distance between these areas, and remains below the threshold of the contrast curve. The exposure of these intermediate areas results in a dose profile having side lobes at the location of the adjacent areas. The additional exposure of an adjacent area is now provided both by the side lobe of the dose profile of a preceding area and the side lobe of the dose profile of the intermediate area. As the distance between the two areas increases, the first contribution to the additional exposure decreases but, in accordance with the invention, the second contribution increases so that the additional exposure of the area to be recorded is independent of the distance between the areas. The power in the radiation beam during exposure of the intermediate areas can be determined from the intensity profile of the radiation spot. Each recorded area thus receives an additional exposure dose at the beginning and at the end. The additional exposure dose should be smaller than about three percent of the constant, predetermined value of the exposure dose. Consequently, each resulting information area is slightly widened at the beginning and at the end. Since this widening is the same for all the information areas, both long and short ones, this will not result in a deterioration of the jitter. An advantage of the fourth write strategy as compared with the third strategy is that the power applied to the intermediate areas depends only on the distance between the exposed areas and not on the lengths of the areas to be written, as in the third strategy. This simplifies power control in the master recorder.

Figure 13:
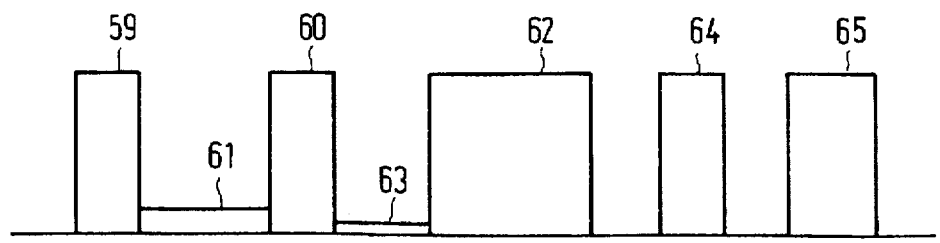
FIG. 13 gives the power of the radiation beam in accordance with the fourth write strategy for a series of areas to be written.
Figure 14:
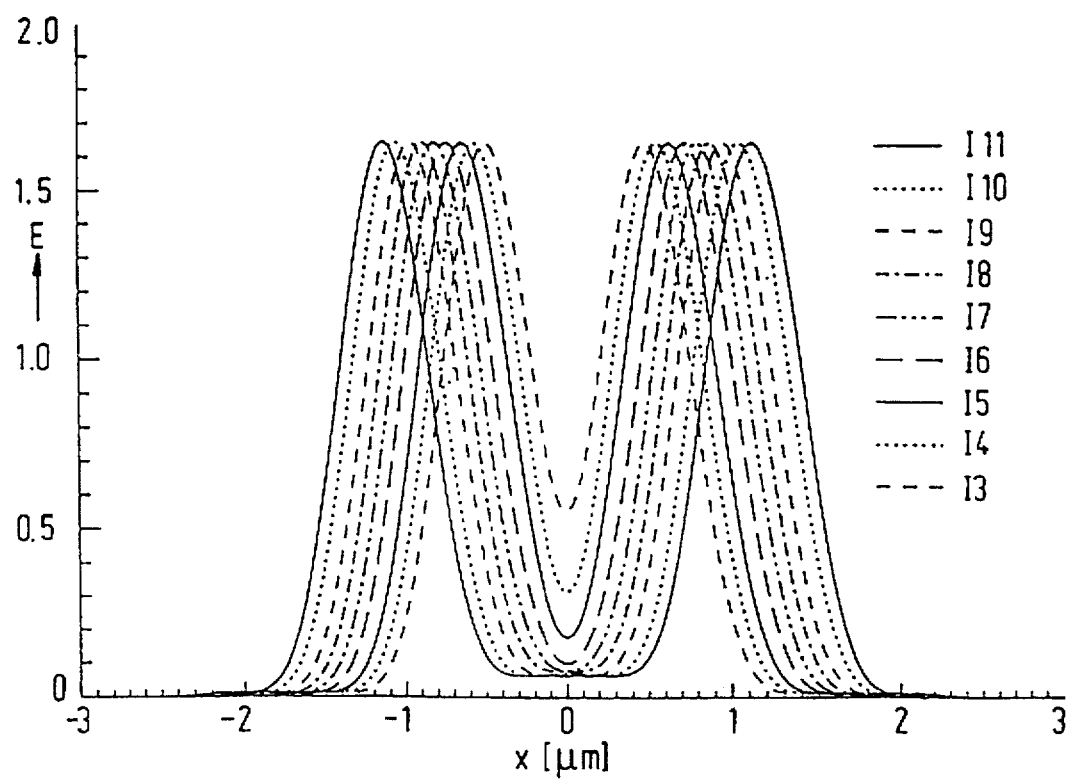
FIG. 14 gives exposure doses in accordance with the fourth strategy for a series of two short areas at different distances.
Figure 15:
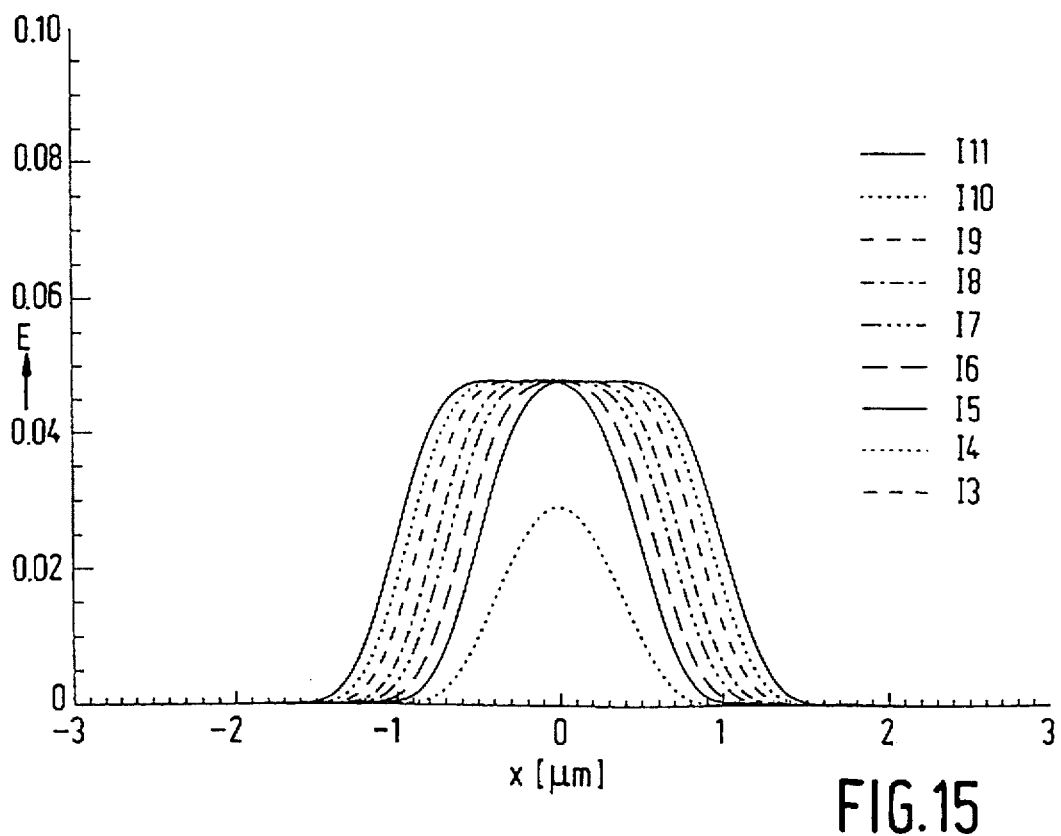
FIG. 15 gives the exposure doses in the intermediate areas of FIG. 14.
Figure 16:
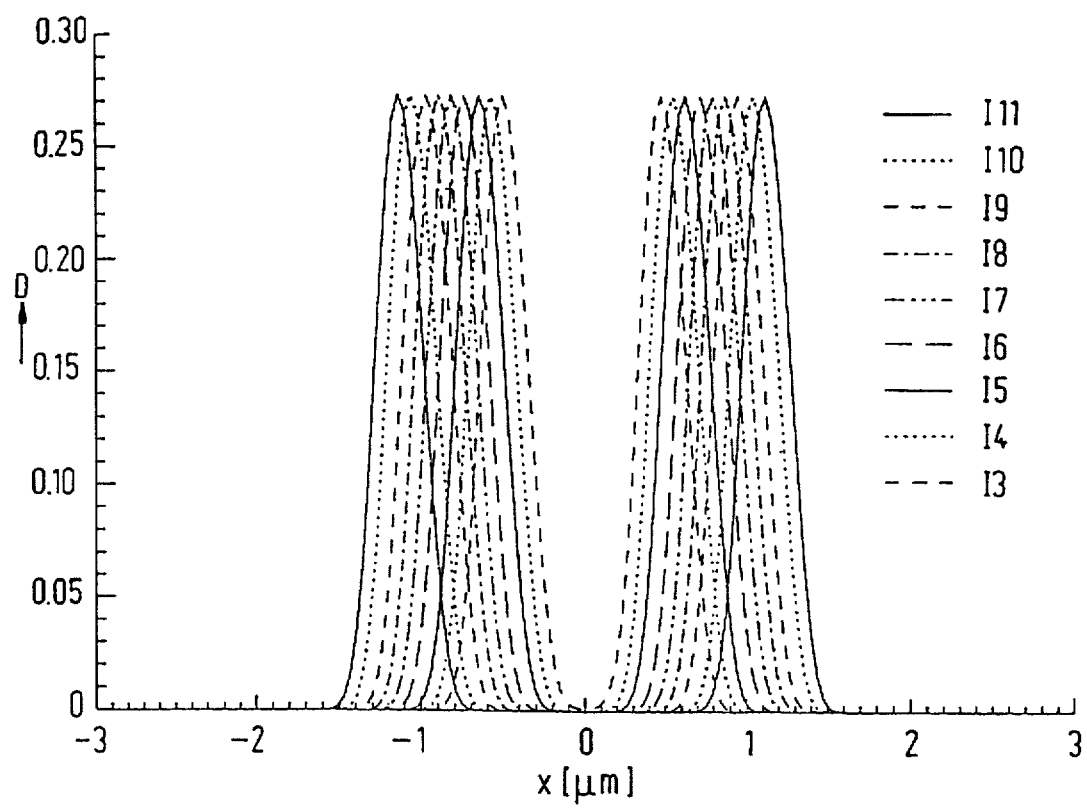
FIG. 16 shows the development profiles associated with the dose profiles in FIG. 14.

FIG. 13 represents, diagrammatically, the power in the radiation beam during recording of a series of areas in accordance with the fourth strategy. All the pulses have the nominal power, which, for the clarity of the drawing, is assumed to be independent of the length of the pulses. In the intermediate area between pulses 59 and 60, the power is maintained at a comparatively low value 61 for the required additional exposure at the end of the pulse 59 and at the beginning of the pulse 60. The distance between pulse 60 and the next pulse 62 is shorter than the distance between pulses 59 and 60, so that power 63 between pulses 60 and 62 is consequently lower than power 61. The distance between pulses 62 and 64 and between 64 and 65 is so small that no additional exposure is required. FIG. 14 shows a series of pairs of adjacent I3 dose profiles, each pair having an intermediate area with a length as indicated in the Figure, obtained by using the fourth strategy. The maximum exposure doses in each of the recorded areas are equal and independent of the distance between the two recorded areas. On the other hand, the exposure doses in the intermediate areas, i.e., around x=0, have increased in comparison with the situation without this strategy as shown in FIG. 10. The exposure doses in the intermediate areas are shown in FIG. 15, the values plotted along the vertical axis being expressed in the same units as in FIG. 14. The dose for the shortest intermediate area, i.e., I3, is zero. FIG. 16 shows development profiles corresponding to the exposure doses in FIG. 14, for a photoresist with a steep contrast curve. All the development profiles shown now have the same shape independently of the distances between the profiles. The information areas produced upon development will therefore have the same size. The development rate between the profiles is substantially zero despite the comparatively high development doses at these locations, as is apparent from FIG. 14. This advantage is obtained owing to the comparatively high threshold value of a high-contrast photoresist.

The third strategy and the fourth strategy can be combined advantageously to form a fifth strategy. This strategy is first of all characterized in that the power of the radiation beam in the intermediate areas has a comparatively low value, which increases as the length of the intermediate areas increases and, secondly, the power at the beginning and the end of an area to be written has a fixed value slightly lower than the nominal value. Exposure of the intermediate areas results in a fixed additional exposure at the beginning and the end of the areas, as explained for the fourth strategy. Reduction of the power at the beginning and the end by a fixed amount compensates for the additional exposure and ensures that the exposure dose is constant over the length of each area independently of the distance between the areas. The resulting information areas consequently have equal widths independently of the distance to adjacent areas. Power control in the fifth strategy is just as simple as in the fourth strategy because the power in the intermediate areas depends only on the length of the intermediate areas and because the power for all the areas to be recorded is corrected in a similar way independently of the length of the area and of the distances from adjacent areas.

FIGS. 6 and 8 show that the development profiles for areas recorded in accordance with the first and the second strategy, respectively, do not have a flat maximum but exhibit slight deviations which depend on the length of the areas. The deviations primarily affect the width of the resulting information areas. In the case of the development profile for, for example, the information area 111 in FIG. 8, the development rate for x=0 is slightly higher than for x=0.6 µm. The development profile in a direction perpendicular to the x direction or write direction, i.e., in a direction perpendicular to the plane of drawing, determines the width of the information area. For x=0, this profile is therefore wider than for x=0.6 µm. As a consequence, the resulting information area for x=0 is wider than for x=0.6 µm. The non-constant width of the information areas results in increased jitter of the read signal. The cause for this is found to reside in the effect the side lobes of the intensity profile have on the convolution of the intensity profile with its displacement, and in the highly non-linear contrast curve. This will be explained with reference to FIG. 17. The upper half of the Figure shows an intensity profile of a radiation spot on the photoresist layer during the recording of an area, the profile moving over a distance represented by an arrow 68 from the starting position of the peak 67 to the end position indicated by peak 69. The base of the profile has two side lobes 70, 71 which are characteristic of the first bright ring of the Airy profile. The displacement of left-hand side lobe 70 during recording is represented by an arrow 72 and that of right-hand side lobe by an arrow 73. The lower half of the Figure shows the corresponding exposure dose on the photoresist layer as a dose profile. The dose profile has side lobes 74, 75 owing to the exposure by the side lobes 70 and 71 of the intensity profile. Portion 76 of the dose profile is caused by exposure by both side lobe 70 and peak 67 of the intensity profile, as is apparent from the overlap of arrows 68 and 72. Portion 77 of the dose profile is a summation of exposure by peak 67 and side lobe 71. A central raised portion 78 of the dose profile is caused by exposure with side lobe 70, side lobe 71 and peak 67 of the intensity profile, as is apparent from the overlap of arrows 68, 72 and 73. Since the intensity profile is substantially rotationally symmetrical, it will be evident that the exposure dose in the central portion, which dose is slightly higher than in adjacent portions 76 and 77, leads to a slightly wider dose profile in a direction perpendicular to the plane of drawing at the location of the central portion. This comparatively small widening of the dose profile, which is caused by the overlap of the exposure by side lobes 70, 71 of the intensity profile, results in a substantial widening of the development profile owing to the steep slope of the contrast curve. As a consequence, the resulting information area will be wider halfway its length than at the ends. In the case of displacements of the radiation spot smaller than shown in FIG. 17, dose profiles may arise with a central dip which represents a local constriction of the resulting information areas. Such width variations lead to increased jitter.

Figure 18:
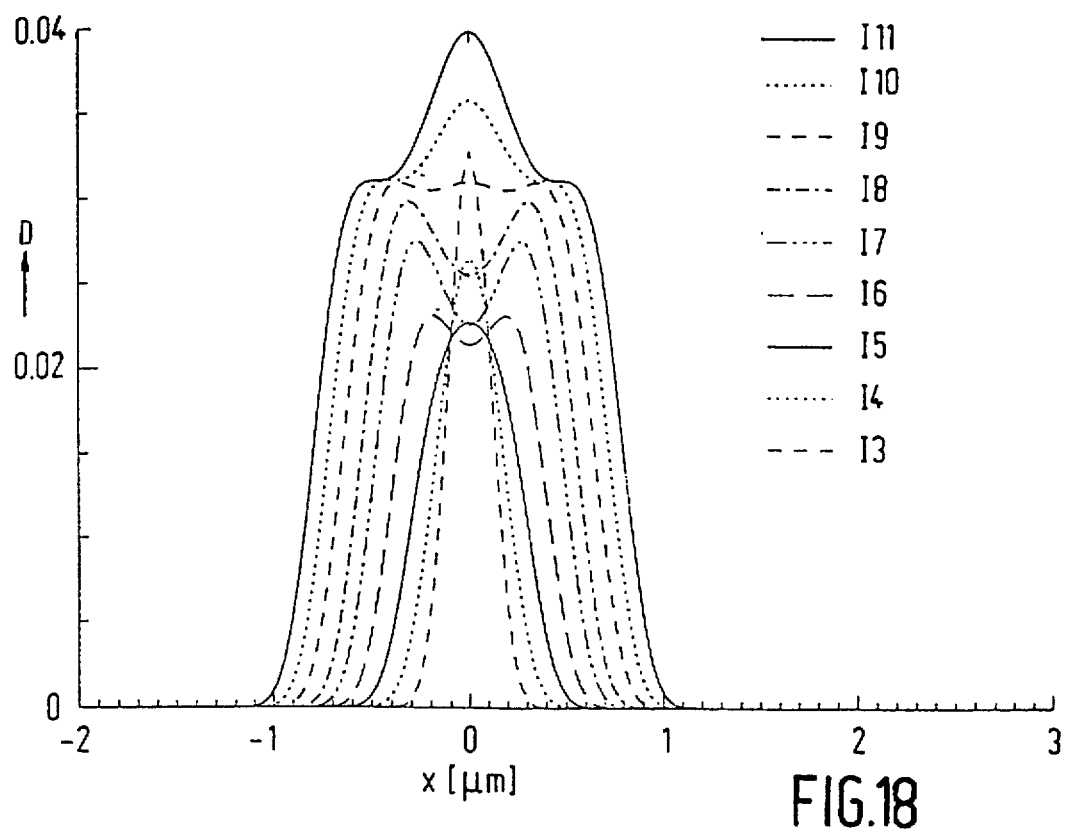
FIG. 18 shows development profiles for EFM information units recorded with a filtered radiation beam.

The above problem of width variations occurs increasingly in master recorders having a filtered objective lens. The purpose of filtering is to change the amplitude or the phase of the radiation emerging from the objective lens in such a manner that the cross-section of the radiation spot at half the maximum intensity level is narrowed, which enables recording with a high density. However, filtering causes the power in the side lobes of the intensity profile of the radiation spot to increase. This results in an increase of the variations in the exposure doses and, hence, of the variations in the width of the information areas. FIG. 18 shows an example of variations in the development profiles for EFM information units with a basic length of 162 nm recorded in accordance with the second strategy in a photoresist having a steep contrast curve, with $\lambda$=458 nm, an objective lens with NA=0.45 and a filter comprising a circular 180° phase plate disposed in the center of the pupil of the objective lens and having a radius equal to 0.3 times the radius of the pupil. It is obvious that in this case, the side lobes will affect both the width and the length of the resulting information areas.

Figure 17:
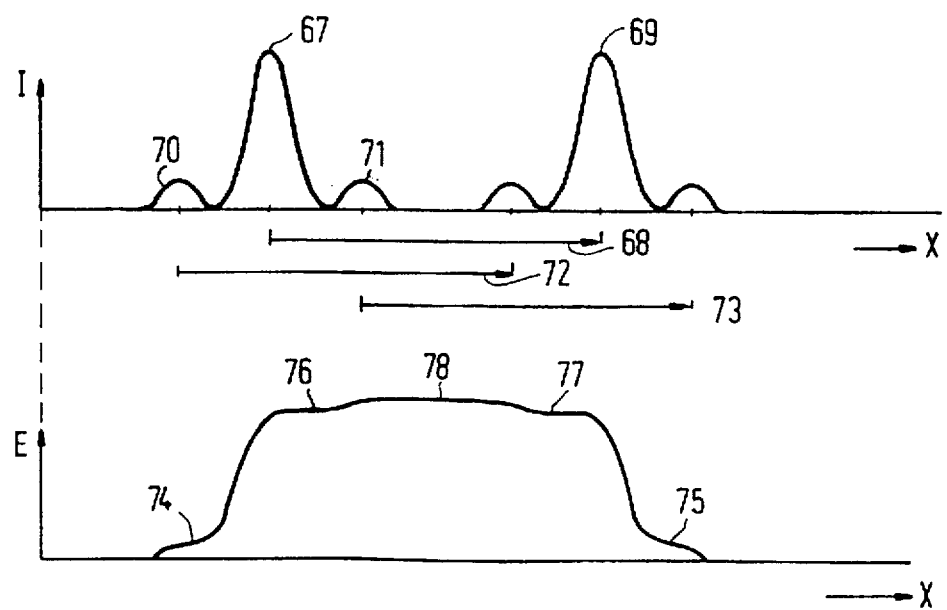
FIG. 17 shows an intensity and dose profile with the effect of the side lobes of the intensity profile.
Figure 19:
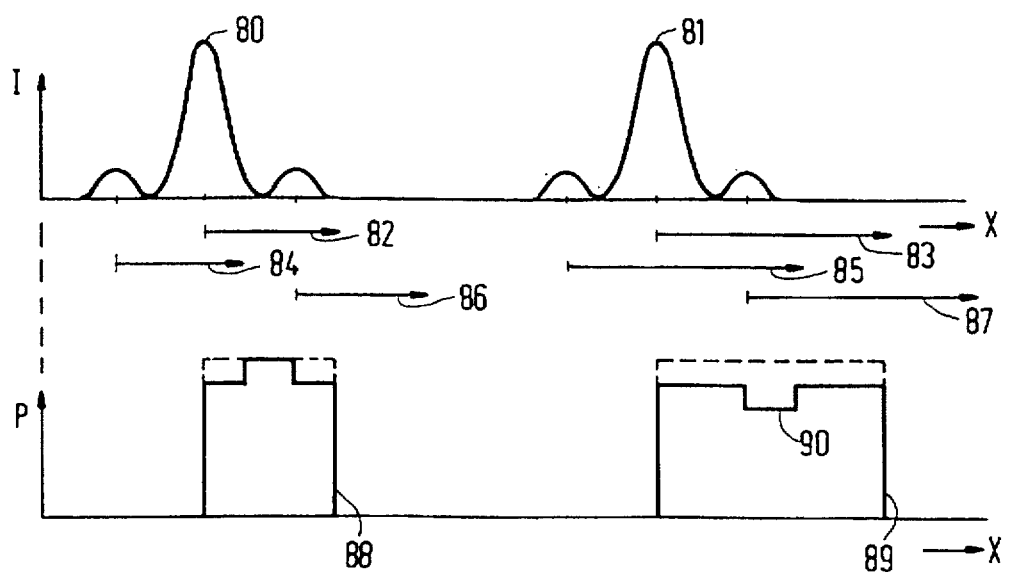
FIG. 19 gives an intensity profile and the power of the radiation beam in accordance with a fifth write strategy.

The adverse effects of the side lobes on the information areas are compensated for if a sixth strategy according to the invention is used. The sixth strategy compensates for the additional exposure dose in the center of the areas which is caused by the side lobes of the intensity profile. The height of the side lobes and the distance from the side lobes to the peak of the intensity profile can be calculated fairly accurately from the wavelength, the numerical aperture of the objective lens, the intensity distribution over the pupil of the objective lens, and the shape of the phase plate, if present. By means of the convolution of the intensity profile with the displacement of this profile, it is possible to calculate the required power in the radiation beam at any instant during the displacement in order to obtain a constant exposure dose over the length of the area. A correction for the side lobes of the dose profiles, such as, for example, the side lobes 74 and 75 in FIG. 17, is not necessary because these are smaller than the threshold of the contrast curve and will giver rise to a negligible development rate. FIG. 19 shows two examples of the effect of the sixth strategy. The upper half of this Figure shows the starting positions of two intensity profiles 80, 81 for recording a comparatively short and a comparatively long area, respectively. Arrows 82, 83 denote the respective displacements of the peak of the intensity profile during recording. Arrows 84, 85 and 86, 87 represent the displacements of the left-hand and right-hand side lobes of the intensity profiles. The lower half of the Figure shows the associated variation of the power P of the radiation beam as function of the displacement of the radiation spot over the photoresist layer for recording the short area and the long area. The broken lines in both power distribution profiles 88 and 89 represent the power in the case that no write strategy would have been used. The power distribution profile 88 for the short area shows that the power at the beginning and the end of the profile is lower than in the case of a profile without write strategy, indicated by a dashed line. The lengths of the two areas with reduced power correspond to the length of overlapping of arrows 82, 84 and 82, 86, respectively. When the long area is recorded, power distribution profile 89 is lowered over the entire length. An additional dip 90 in the center of the profile compensates for the three-fold overlap of arrows 83, 85 and 87. The three-fold overlap corresponds to raised portion 78 in the dose profile in FIG. 17.

Figure 20:
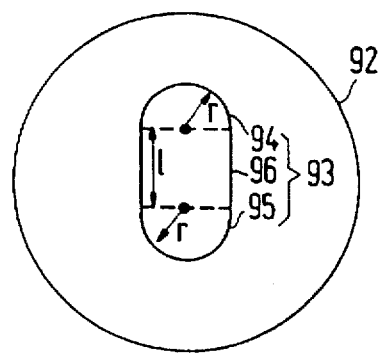
FIG. 20 shows the pupil of the objective lens of the master recorder with an elliptical phase plate.

The sixth strategy described above compensates for the effects of the side lobes of the intensity profile of the radiation spot. However, the compensation becomes less effective when the side lobes are more pronounced. Allowance is to be made for this in the design of the filter for the objective lens. Therefore, the phase plate is preferably not circular but elliptical. FIG. 20 shows a pupil 92 of the objective lens in which a 180° phase plate 93 is disposed, which phase plate comprises two semi-circular parts 94, 95 each having a radius r and a rectangular part 96 having a length 1. Owing to this shape, a part of the power in the side lobes is transferred from the horizontal direction in FIG. 10 to the vertical direction or, in relation to the write process, from the write direction to a direction perpendicular thereto. In this last-mentioned direction, side lobes have little effect on the development process because the total exposure dose in this direction remains below the threshold of the contrast curve. Another advantage of the elliptical phase plate is that the intensity loss produced by it is smaller than that produced by the circular phase plate for a similar narrowing of the central lobe. In accordance with the invention, the parameters r and 1 of the phase plate as a fraction of the pupil radius are in the range 0<r<0.4 and 0<1<0.5, and are preferably about r=0.18 and 1=0.3. The maximum intensity of the side lobes in the horizontal or write direction in the last-mentioned case is only approximately 40% of the maximum intensity of the side lobes in the vertical direction, i.e., in a direction perpendicular to the write direction.

Figure 21:
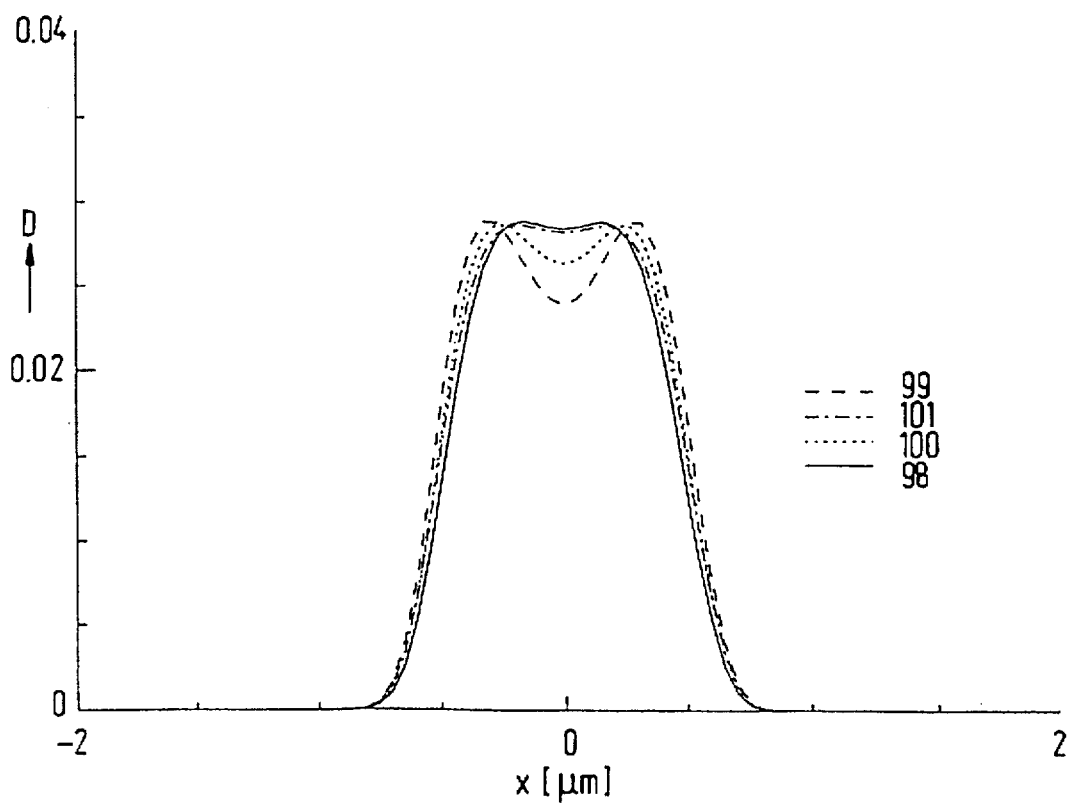
FIG. 21 shows development profiles for an I9 signal with and without phase plate.

The elliptical phase plate narrows the central lobe of the intensity profile in a similar way as the circular phase plate, so that short recorded areas can become even shorter. However, when long areas are exposed, the comparatively strong side lobes overlap with the central lobe so that an exposed area is elongated. The elongation can be used advantageously instead of, or in addition to, the elongation obtained with the second strategy, which also enables long areas to be prolonged. FIG. 21 shows the effect of the phase plate on the development profile of the comparatively long I9 information unit. A solid line 98 represents the development profile obtained without a phase plate, a dashed line 99 represents the profile obtained with the circular phase plate, and a dotted line 100 represents the profile obtained with the elliptical phase plate, a strategy in accordance with the invention being used in none of these cases. The Figure clearly shows the elongation of the profile caused by the circular phase plate. The elongation caused by the elliptical phase plate is slightly smaller owing to the smaller side lobes in the write direction. The sag in the peak of the development profile is 17% for the circular phase plate and only 8% for the elliptical phase plate. Consequently, compensation for profile 100 by the sixth strategy is easier than for profile 99. A dash-dot line 101 represents the compensated profile obtained with the circular phase plate. When very long structures such as, for example, tracking grooves are recorded it is advisable to rotate the elliptical phase plate through 90° in the plane of this plate so that the major axis of the phase plate extends in the write direction, in order to obtain narrower grooves.

The write strategies, in accordance with the invention, can each be used individually or in a combination of two or more strategies. By means of the write strategies, information areas can be obtained whose length is of the order of $\lambda/(2NA)$. The use of the strategies yields information carriers of which substantially all the information areas have lengths which deviate less than 50 nm from the lengths of the associated information units. A relatively small number of information areas associated with defects of the information carrier may have larger deviations without impairing the operation of a reading device. The number depends on the strength of the error-correction capabilities of suitable reading devices and is, in general, of the order of 1 per mil of the total number of information areas. The length of an information unit can be derived from the duration of the information unit and the scanning speed of the reading device. The deviation often shows a Gaussian distribution. The standard deviation of the distribution, i.e., of the length, is less than 14 nm when the second strategy in accordance with the invention is used, and less than 10 nm when the second strategy is used in combination with one or more of the other strategies. The lengths of the intermediate areas have similar deviations from the desired lengths. The deviations of the lengths of information areas and intermediate areas on an information carrier from the information units associated with the information areas and the intermediate areas can be measured by means of a time interval analyzer and an optical scanning device suitable for reading the information carrier under investigation. By means of such a measurement, it is also possible to derive the lengths of the information units so that said deviations can also be determined for an information carrier of which the lengths of the information areas are not given. The spread in width of the information areas is less than 30 nm, i.e., the difference between the widest and the narrowest information area on an information carrier is smaller than 30 nm, apart from a few incorrectly formed information areas. As the lower limit of the spread, 1 nm may be taken by way of delimitation from Figures in the literature showing information areas of exactly equal widths. However, such Figures are not representative of the actual situation and said literature does not yet recognize the problem for which the present invention provides solutions. The small deviations of the length and width of the information areas obtained in accordance with the invention lead to an acceptably low jitter in the read signal produced when reading such information carriers.

Figure 22:
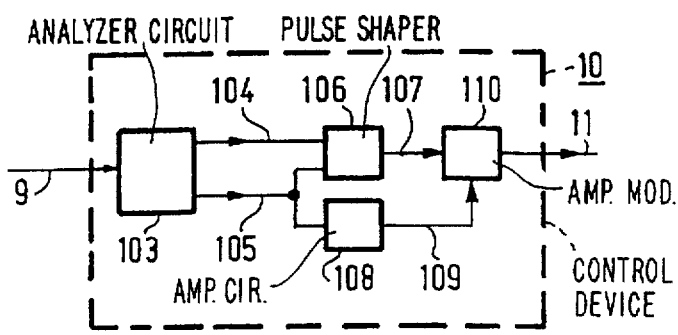
FIG. 22 shows a first embodiment of the control device of the master recorder.

To carry out the write strategies in accordance with the invention, master recorder 2 shown in FIG. 2 should be adapted in a special manner. Control device 10 should convert input signals 9, representing the information to be recorded, into output signal 11 in such a manner that modulator 14 controlled by this device produces such a power modulation of radiation beam 15 that the exposure dose is constant over the lengths of the exposed areas. FIG. 22 shows an example of control device 10 which controls the exposure dose in accordance with the second write strategy. An analyzer circuit 103 derives, from the information units in the input signal 9, a trigger signal 104, which indicates at which instant an information unit starts, and a length signal 105, which is representative of the length of this information unit. A pulse shaper circuit 106 subsequently generates a pulsed signal 107 with the aid of the trigger and the length signal. The start of each pulse in signal 107 is advanced relative to the trigger signal by a time interval determined by the length of the information unit. FIG. 9, which has been discussed above, gives an example of the length-dependent advancement of the output pulse for EFM coded information units. The length of the output pulse has been extended depending on the length of the information unit, of which FIG. 9 also gives an example. An amplitude circuit 108 converts the length signal 105 into an amplitude signal 109 by means of which the power of the radiation beam is controlled in a manner as shown, for example, in FIG. 9. Finally, an amplitude modulator 110 generates a pulsed output signal 11 whose pulse starting instants and lengths depend on signal 107 and whose amplitudes depend on amplitude signal 109. For EFM coded information units, these pulses may have the shape as shown in FIG. 9. Output signal 11 controls modulator 14 so as to control the power in the radiation beam.

Figure 23:
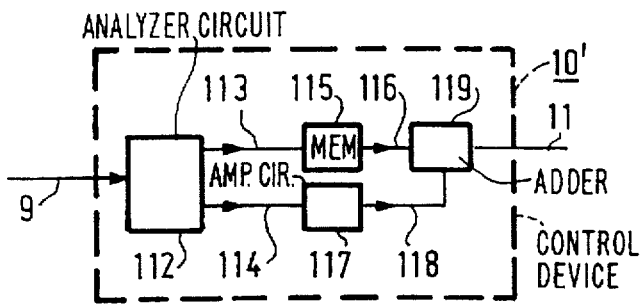
FIG. 23 shows a second embodiment of the control device.
Figure 24:
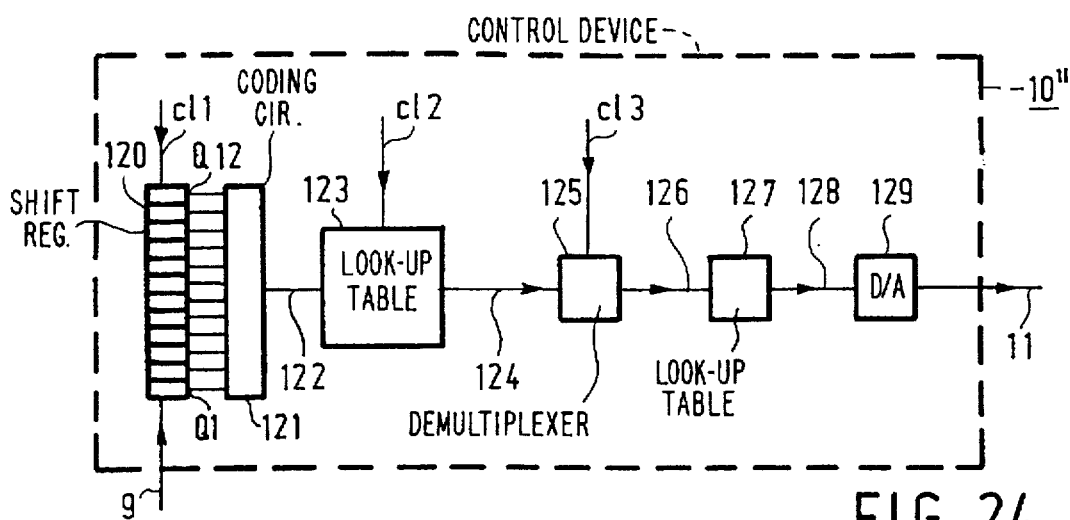
FIG. 24 shows a third embodiment of the control device.

FIG. 23 shows a second embodiment of the control device 10', which controls the exposure dose in accordance with the second, the fifth and the sixth write strategy. An analyzer circuit 112 derives, from input signal 9, a first length signal 113, which represents the length and the starting instant of an information unit in input signal 9, and a second length signal 114, which represents the nominal distance between the preceding and the current information unit. The first length signal 113 is applied to an input of a memory circuit 115, in which pulse waveforms of different lengths and amplitudes are stored. Depending on the value of the length signal, a pulse waveform is selected and is output as an output pulse in a signal 116. The beginning of the output pulse has been shifted relative to the start of the information unit and the length of the output pulse has been increased relative to the length of this unit, both as prescribed by the second strategy. The amplitude of the output pulse is varied over the length of the pulse in a manner as prescribed by the fifth and the sixth strategy. The second length signal 114 is applied to an amplitude circuit 117, which, in accordance with the fifth strategy, converts the length into a signal 118 whose amplitude depends on the value of the second length signal and which represents the power in the radiation beam between the recorded areas. An adder circuit 119 adds signals 116 and 118 to form output signal 11.

24 shows a third embodiment of the control device 10", which has a great flexibility regarding adaptation of the write strategy. Moreover, it has the advantage that the information units to be recorded can be processed real-time at high speed because at several stages of the processing, the data is processed in parallel instead of serially. The information units of input signal 9 are input in a shift register 120. The size of the shift register is 12 cells, suitable for processing EFM coded signals. However, the register may have any size required for a specific code. The information units shift through the register at a rate of one bit cell per clock pulse of a clock signal cl1. At each clock pulse, the contents of the cells of the register are available at outputs Q1 to Q12 of the register. The outputs Q1 to Q12 are connected to inputs of a coding circuit 121. The coding circuit produces an output signal 122 each time the value of output Q11 is different from the value of output Q12. At that instant, the coding circuit determines the number of consecutive binary 'ones' or 'zeros' in the output signals up to Q11. If, for example, the signals Q8 to Q12 have the values 01110, then the coding circuit will detect an I3 information unit to be recorded. The coding circuit assigns a unique code to the combination of input signals of the circuit by means of a first look-up table integrated in the coding circuit. The look-up table has one entry for each series of 'ones' and for each series of 'zeros' that may occur in the input signal 9.

The code is transmitted as a parallel output signal 122 to a second look-up table 123. Look-up table 123 specifies, for each code, a sequence of amplitude values to be transmitted as output signal 11 to modulator 14. In order to be able to provide sufficient time resolution in output signal 11, each bit cell of the input signal 9 is divided in 32 consecutive sub-cells. Therefore, look-up table 123 gives, for each code at its input, a number of amplitude values at an output 124 equal to 32 times the number of bit cells belonging to the code. The output of look-up table 123 is clocked with a clock signal cl2, which is synchronized with clock signal cl1. The code input in the look-up table 123 preferably comprises an address and a length value. The address points to the location of the first amplitude value in the look-up table pertaining to the code, whereas the length indicates the number of amplitude values pertaining to the code. Once a new code is transmitted to look-up table 123, read-out starts at the address transmitted and ends a number of clock cycles later as indicated by the length transmitted. At the completion of the read-out of the amplitude values pertaining to the code, the next code is available at the input of the look-up table 123, and the next read-out cycle can start. The amplitude values are symbolic values, indicating a level, e.g., high, medium and low for a three-level amplitude control. The control uses preferably 256 levels, each coded in 8 bits. The amplitudes are transmitted as a 32-bit parallel output signal 124, i.e., four amplitude values in parallel. Clock signal cl2 runs therefore 32/4=8 times as fast as clock signal cl1.

Output signal 124 is demultiplexed from 32-bit to 8-bit wide signals in demultiplexer 125, which runs on a clock signal cl3, again synchronized with clock signal cl1 and running 32 times as fast as cl1. The 8-bit parallel output signal 126 of the demultiplexer are input in a relatively small and fast look-up table 127, translating the symbolic amplitude values at its input in real amplitude values at its output. The output signal 128 of look-up table 127 is connected to a fast digital-to-analog converter 129 transforming the digital input values to analog output values. The conversion rate is equal to 32 times the frequency of clock signal cl1. The analog output values constitute output signal 11 for controlling modulator 14 and hence, the power of the radiation beam. Demultiplexer 125, look-up table 127 and converter 129 are commercially available in a single unit in the form of a fast so-called video RAM-DAC.

The use of symbolic values in look-up table 123 has the advantage that a write strategy can be implemented for all information units in the input signal without regard to the precise values of the amplitudes. The values of the amplitudes are stored in look-up table 127, and can easily be adapted to the specific recording and development conditions, without modifying the rather extensive look-up table 123. In case this flexibility is not needed, the real amplitudes can be stored in look-up table 123, and look-up table 127 can be dispensed with. Although the functioning of control device 10" has been described for the implementation of the first strategy, only modifying the power of the radiation beam, the other strategies according to the invention can equally be implemented in the control device. The second write strategy may be implemented by increasing the number of amplitude values pertaining to a code in look-up table 123, thereby providing leading and trailing values as required by this strategy. The number of amplitude values in look-up table 123 for the intermediate areas must be reduced accordingly. In the third strategy, the amplitudes depend on the length of the area to be recorded and on the lengths of the preceding and following intermediate areas. An implementation must therefore comprise a shift register of a length equal to the longest area to be recorded plus twice the length of the longest intermediate area, i.e., 33 cells for an EFM input signal. The coding circuit must give a unique code to each combination of an area to be recorded and the two neighboring intermediate areas.

Figure 25:
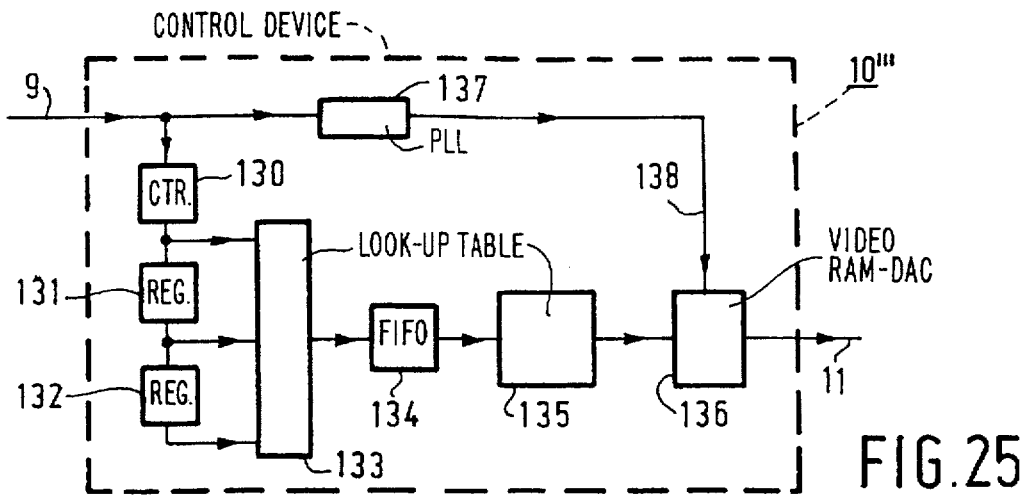
FIG. 25 shows a fourth embodiment of the control device.

FIG. 25 shows a fourth embodiment of the control device 10'", in which the shift register 123 of the third embodiment is replaced by a counter 130. The counter counts the number of consecutive binary zeros and ones in the input signal 9. At a transition from zero to one in the input signal, the counting starts. At the next one to zero transition, the counting stops, the contents of a first register 131 is transferred to a second register 132, next, the count, representing the length of the information unit, is transferred from the counter 130 to the first register 131, and counter 130 is set to zero. At said one to zero transition in the input signal, counter 130 starts counting the number of consecutive zeros in the input signal. At the following zero to one transition, this number of zeros is transferred to register 131 after the contents of this register have been transferred to register 132. Consequently, the outputs of register 131, register 132 and counter 130 represent the length of an information area to be recorded and the lengths of the preceding and the following intermediate areas, respectively, or the lengths of an intermediate area and the preceding and following information areas. When the control device is adapted for the first write strategy, i.e., the power of the radiation beam for writing an information area is modified independent of the length of the neighboring intermediate areas, only the output of the counter or one of the registers is needed. When the control device is adapted for the third write strategy, in which the power does depend on the lengths of the neighboring intermediate areas, the outputs of counter 130, register 131 and register 132 are needed.

The outputs of counter 130, register 131 and register 132 are connected to a first look-up table 133, where they form an address. The entry of the look-up table belonging to the address contains an address and a length value, comparable to the entries of the look-up table in the coding circuit 121 of the third embodiment of the coding device. The address and length value are transferred to a second look-up table 135 via a first-in first-out (FIFO) buffer 134. Each address value points to a specific location in the second look-up table. At each location, i.e., for each information area or intermediate area, a sequence of amplitude values corresponding to radiation beam powers is stored. The length of the sequence is equal to the length value given by the first look-up table. The amplitude values are symbolic values, for instance coded in 256 levels, as in look-up table 123 of the third embodiment. The time resolution of the control device is increased by providing several amplitude values, e.g., 32, for each bit cell of the input signal 9. When the duration of a bit cell is, for instance, 250 ns, the second look-up table provides 32 8-bit values to be output in this 250 ns. The clock frequency of the second look-up table is reduced by outputting the amplitude values 32 bits in parallel.

The amplitude values of the second look-up table are input in a combined demultiplexer, third look-up table and digital-to-analog converter, which may be a so called video RAM-DAC 136. The demultiplexer changes the 32-bit wide input signals to four serial 8-bit wide signals, thereby increasing the clock frequency of the signals by a factor of four. The symbolic amplitude values represented by the 8-bit wide signals are converted to real amplitude values by the third look-up table. The fast digital-to-analog converter changes the digital real amplitude values to analog amplitude values at a rate of 32 times the rate of the bit cells in the input signal 9. The analog amplitude values constitute output signal 11 for controlling modulator 14 and hence the power of the radiation beam.

A phase-locked loop circuit 137 generates a clock signal 138 with a frequency 32 times the bit cell frequency of the input signal 9. Clock signal 138 is used as input for the RAM-DAC 136. FIFO buffer 134 at the output of the first look-up table 133 buffers the address and length values from table 133 before they are input to look-up table 135. The buffer compensates timing variations in clock signal 138 introduced by circuit 137. The buffer 134 also compensates the difference between the rate at which the address and length values are generated by the first look-up table 133 and the rate at which the values are needed at the input of the second look-up table 135. When, for example, in the input signal 9, an I11 information unit is followed by an I3 intermediate area, the address and length value for the I11 area is generated immediately after the end of the I11, and three bit cell times later, the address and length value for the I3 intermediate area is generated. When the I11 address and length value is input to the second look-up table 135, it takes 11 bit cell times to output all amplitude values. Only after all amplitude values have been output, the I3 address and length value can be input in the second look-up table. Hence, the I3 address and length value must wait about 8 bit cell times in buffer 134.

The fourth embodiment of the control device has the same flexibility for adaptation to write strategy and codes as the third embodiment.

It will be apparent from the above description that the strategies in accordance with the invention can be used in any desired combination and implemented in control device 10 of the master recorder 2. Generally, more strategies will have to be used as the density of the information to be recorded increases. It has been found that the use of these strategies enables master discs having an information density four times as high as that of a conventional Compact Disc to be recorded by means of a master recorder designed for recording master discs for these conventional Compact Discs.

Although the strategies in accordance with the invention offer substantial advantages when high-contrast photoresists are used, they will also yield advantages, even though smaller, when low-contrast photoresists are used. Recording information in a master disc is essentially a special form of writing patterns with closely spaced details by means of a radiation beam in a photoresist layer on a substrate which is also used for manufacturing, for example, diffraction gratings. Therefore, the method and information carrier described above are to be understood to include such methods and substrates.

We claim:

1. An optical information carrier comprising a substrate having information units stored thereon, in which the information units are stored on the substrate in the form of information areas each having a length, wherein the lengths of substantially all information areas deviate less than 50 nm from the lengths of the associated information units.

2. An optical information carrier comprising a substrate having information units stored thereon, in which the information units are stored on the substrate in the form of information areas each having a length, wherein the difference between the lengths of the information areas and the lengths of the associated information units have a standard deviation of less than 10 nm.

3. An optical information carrier comprising a substrate having information units stored thereon, in which the information units are stored on the substrate in the form of information areas, each having a length, and intermediate areas between adjacent information areas, each of said intermediate areas also having a length, wherein the lengths of substantially all intermediate areas deviate less than 50 nm from the distances between the associated information units.

4. An optical information carrier comprising a substrate having information units stored thereon, in which the information units are stored on the substrate in the form of information areas, each having a length, and intermediate areas between adjacent information areas, each of said intermediate areas also having a length, wherein the differences between the lengths of the intermediate areas and the lengths of the associated information units have a standard deviation of less than 10 nm.

5. An optical information carrier comprising a substrate having information units stored thereon, in which the information units are stored on the substrate in the form of information areas each having a width, characterized in that the spread in width of the information areas is smaller than 30 nm.

6. An optical information carrier according to claim 1, in which the information areas are pits in a layer of the optical information carrier.

7. An optical information carrier according to claim 2, in which the information areas are pits in a layer of the optical information carrier.

8. An optical information carrier according to claim 3, in which the information areas are pits in a layer of the optical information carrier.

9. An optical information carrier according to claim 4, in which the information areas are pits in a layer of the optical information carrier.

10. An optical information carrier according to claim 5, in which the information areas are pits in a layer of the optical information carrier.

* * * * *